US010946408B2

(12) United States Patent
Weinmann et al.

(10) Patent No.: US 10,946,408 B2
(45) Date of Patent: Mar. 16, 2021

(54) METHODS FOR APPLYING MATERIALS TO INTERFACE AREAS AND APPLICATOR COMPRISING A SURFACE INTERFACE GUIDE FORMING A CONTINUOUS RING-SHAPED FLOW CHANNEL

(71) Applicant: The Boeing Company, Chicago, IL (US)

(72) Inventors: Jake B. Weinmann, Signal Hill, CA (US); Raul Tomuta, Stanton, CA (US); John W. Pringle, IV, Gardena, CA (US); Angelica Davancens, Reseda, CA (US); Martin Hanna Guirguis, Long Beach, CA (US); Frederick Brian Frontiera, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 133 days.

(21) Appl. No.: 15/942,124

(22) Filed: Mar. 30, 2018

(65) Prior Publication Data
US 2018/0221914 A1 Aug. 9, 2018

Related U.S. Application Data

(62) Division of application No. 14/662,970, filed on Mar. 19, 2015, now Pat. No. 9,968,962.

(51) Int. Cl.
*B05D 1/26* (2006.01)
*B05C 17/015* (2006.01)
(Continued)

(52) U.S. Cl.
CPC ......... *B05C 5/0225* (2013.01); *B05C 5/0212* (2013.01); *B05C 17/015* (2013.01);
(Continued)

(58) Field of Classification Search
CPC ....... B05D 1/26; B05C 17/015; B05C 5/0225; B05C 5/0212; B05C 5/0204;
(Continued)

(56) References Cited

U.S. PATENT DOCUMENTS 2,484,102 A    10/1949  Valley
2,710,113 A *  6/1955  Pritchard ............... B64D 37/06
                                                        220/681
(Continued)

FOREIGN PATENT DOCUMENTS

JP    201094644 A  *  4/2010
JP    2010094644 A     4/2010
(Continued)

OTHER PUBLICATIONS

"U.S. Appl. No. 14/662,970, Advisory Action dated Mar. 2, 2017", 5 pages.
(Continued)

*Primary Examiner* — William P Fletcher, III
(74) *Attorney, Agent, or Firm* — Kwan & Olynick LLP

(57) ABSTRACT

Provided are methods and systems for applying materials at interface areas formed by fasteners and parts. Specifically, a material is delivered to an interface area such that at least a portion of a fastener remains free from this material. The interface area may be sealed such that the material is contained within that area. As such, a controlled amount of the material is dispensed in a precise location. An applicator used for this process may include a housing and inner guide slidably disposed within this housing. The material may be delivered through an annular flow channel between the housing and inner guide. The inner guide may be sealed against and, in some embodiments, centered with respect to the fastener. The housing may be sealed with respect to the
(Continued)

part and, in some embodiments, may be rotated with respect to the part to redistribute the material at the interface area.

24 Claims, 16 Drawing Sheets

(51) Int. Cl.
  *B05C 5/02* (2006.01)
  *F16B 33/00* (2006.01)
  *B05C 17/005* (2006.01)
  *B64F 5/10* (2017.01)

(52) U.S. Cl.
  CPC .............. *B05D 1/26* (2013.01); *F16B 33/004* (2013.01); *B05C 5/0204* (2013.01); *B05C 17/00516* (2013.01); *B64F 5/10* (2017.01)

(58) Field of Classification Search
  CPC ..... B05C 17/00516; B05C 5/02; B05C 11/00; F16B 33/004; B64F 5/10; B64F 5/00
  See application file for complete search history.

(56) References Cited

U.S. PATENT DOCUMENTS

| | | | |
|---|---|---|---|
| 2,984,393 A | | 5/1961 | Magnenat |
| 3,187,965 A | | 6/1965 | Bourget |
| 3,238,287 A | * | 3/1966 | Chapman ................ F16B 37/14 264/276 |
| 3,350,774 A | * | 11/1967 | Bridges, Sr. ............. B21J 15/02 29/564 |
| 3,469,825 A | | 9/1969 | Dubois |
| 3,494,325 A | * | 2/1970 | Magee .................... B05C 11/10 118/50 |
| 3,791,590 A | | 2/1974 | Dieter |
| 4,003,501 A | | 1/1977 | Ramazzotti et al. |
| 4,253,588 A | | 3/1981 | Lester et al. |
| 4,437,611 A | | 3/1984 | Gilroy |
| 4,480,983 A | | 11/1984 | Adams et al. |
| 4,519,974 A | | 5/1985 | Bravenec et al. |
| 4,589,572 A | | 5/1986 | Pomarolli |
| 4,687,123 A | | 8/1987 | Hyde |
| 4,711,379 A | | 12/1987 | Price |
| 4,798,314 A | | 1/1989 | Worth et al. |
| 4,927,346 A | | 5/1990 | Kaiser et al. |
| 4,941,614 A | | 7/1990 | Ilott |
| 4,958,769 A | | 9/1990 | Schowiak |
| 4,971,745 A | * | 11/1990 | Ferenc ................. B29C 45/14336 264/263 |
| 5,010,841 A | | 4/1991 | Stewart |
| 5,018,892 A | | 5/1991 | Krueckel et al. |
| 5,086,953 A | | 2/1992 | Twede |
| 5,114,055 A | | 5/1992 | Worth |
| 5,322,381 A | * | 6/1994 | Argo, II ................ B65D 47/06 222/566 |
| 5,379,938 A | | 1/1995 | Perret, Jr. |
| 5,431,343 A | | 7/1995 | Kubiak et al. |
| 5,462,199 A | | 10/1995 | Lenhardt |
| 5,954,877 A | | 9/1999 | Hayes |
| 6,296,702 B1 | | 10/2001 | Bryning et al. |
| 6,915,928 B2 | | 7/2005 | Brooks |
| 7,008,433 B2 | | 3/2006 | Voellmicke et al. |
| 8,256,372 B2 | | 9/2012 | Lin |
| 8,281,962 B2 | | 10/2012 | Ogawa et al. |
| 8,562,888 B2 | * | 10/2013 | Kelley ................... B64D 37/02 264/263 |
| 9,004,003 B2 | | 4/2015 | Hart et al. |
| 9,968,962 B2 | | 5/2018 | Weinmann et al. |
| 2002/0156483 A1 | | 10/2002 | Voellmicke et al. |
| 2003/0089795 A1 | | 5/2003 | Kikuchi |
| 2005/0042381 A1 | | 2/2005 | Weiss et al. |
| 2006/0024122 A1 | | 2/2006 | Nealon et al. |
| 2007/0018015 A1 | | 1/2007 | Amron |
| 2008/0134971 A1 | * | 6/2008 | Bradley ................. F26B 23/04 118/641 |
| 2008/0230002 A1 | | 9/2008 | Hirata et al. |
| 2009/0217868 A1 | | 9/2009 | Caseteuble |
| 2009/0314200 A1 | | 12/2009 | Lin |
| 2010/0080912 A1 | | 4/2010 | Koyama et al. |
| 2011/0079618 A1 | | 4/2011 | Chastine et al. |
| 2014/0138413 A1 | | 5/2014 | Gunsell et al. |
| 2014/0326760 A1 | | 11/2014 | Topf et al. |
| 2014/0367480 A1 | | 12/2014 | Toh et al. |
| 2014/0367481 A1 | | 12/2014 | Toh et al. |
| 2015/0001261 A1 | | 1/2015 | Johnson |
| 2015/0028051 A1 | | 1/2015 | Topf et al. |
| 2015/0044369 A1 | | 2/2015 | Keener |
| 2015/0044376 A1 | | 2/2015 | Topf et al. |
| 2015/0053787 A1 | | 2/2015 | Tomuta et al. |
| 2015/0064357 A1 | | 3/2015 | Tomuta et al. |
| 2015/0306608 A1 | | 10/2015 | Petter et al. |
| 2016/0199861 A1 | * | 7/2016 | Boser .................... B05B 9/0811 222/1 |
| 2016/0271644 A1 | | 9/2016 | Weinmann et al. |
| 2016/0297021 A1 | | 10/2016 | Senga et al. |
| 2016/0332189 A1 | | 11/2016 | Clark |

FOREIGN PATENT DOCUMENTS

| | | |
|---|---|---|
| JP | 2013036566 A | 2/2013 |
| RU | 2214898 C2 | 10/2003 |
| WO | 2012161845 A1 | 11/2012 |
| WO | 2013132115 A1 | 9/2013 |
| WO | 2013154773 A1 | 10/2013 |

OTHER PUBLICATIONS

"U.S. Appl. No. 14/662,970, Examiner Interview Summary dated Jan. 25, 2017", 4 pages.

"U.S. Appl. No. 14/662,970, Examiner Interview Summary dated Mar. 29, 2017", 3 pages.

"U.S. Appl. No. 14/662,970, Examiner Interview Summary dated Mar. 2, 2017", 2 pages.

"U.S. Appl. No. 14/662,970, Examiner Interview Summary dated Aug. 23, 2017", 4 pgs.

"U.S. Appl. No. 14/662,970, Examiner Interview Summary dated Nov. 15, 2017", 1 page.

"U.S. Appl. No. 14/662,970, Examiner Interview Summary dated Dec. 26, 2017", 3 pages.

"U.S. Appl. No. 14/662,970, Final Office Action dated Nov. 4, 2016", 17 pages.

"U.S. Appl. No. 14/662,970, Final Office Action dated Nov. 15, 2017", 25 pages.

"U.S. Appl. No. 14/662,970, Non Final Office Action dated Jun. 16, 2016", 16 pages.

"U.S. Appl. No. 14/662,970, Non Final Office Action dated Jun. 26, 2017", 21 pgs.

"U.S. Appl. No. 14/662,970, Notice of Allowance dated Jan. 29, 2018", 10 pages.

"U.S. Appl. No. 14/662,970, Restriction Requirement dated Apr. 7, 2016", 5 pages.

"European Application Serial No. 16159790.1, Office Action dated Feb. 20, 2018", 4 pgs.

"European Application Serial No. 16159790.1, Search Report dated Aug. 29, 2016", 8 pages.

Davancens, Angelica et al., "Systems and Methods for Dispensing a Substance on a Surface", U.S. Appl. No. 14/291,216, filed May 30, 2014, 45 pgs.

Topf, Richard P. et al., "End Effector for Cleaning Objects Having Multiple Surfaces", U.S. Appl. No. 14/097,845, filed Dec. 5, 2013, 84 pgs.

"Russian Application Serial No. 2016100771/05(000936), Office Action dated Apr. 12, 2019", 12 pgs.

Japanese Application Serial No. 2016-031665, Office Action dated Dec. 24, 2019, 9 pgs.

Australian Application Serial No. 2016200364, Office Action dated Jun. 9, 2020, 3 pgs.

* cited by examiner

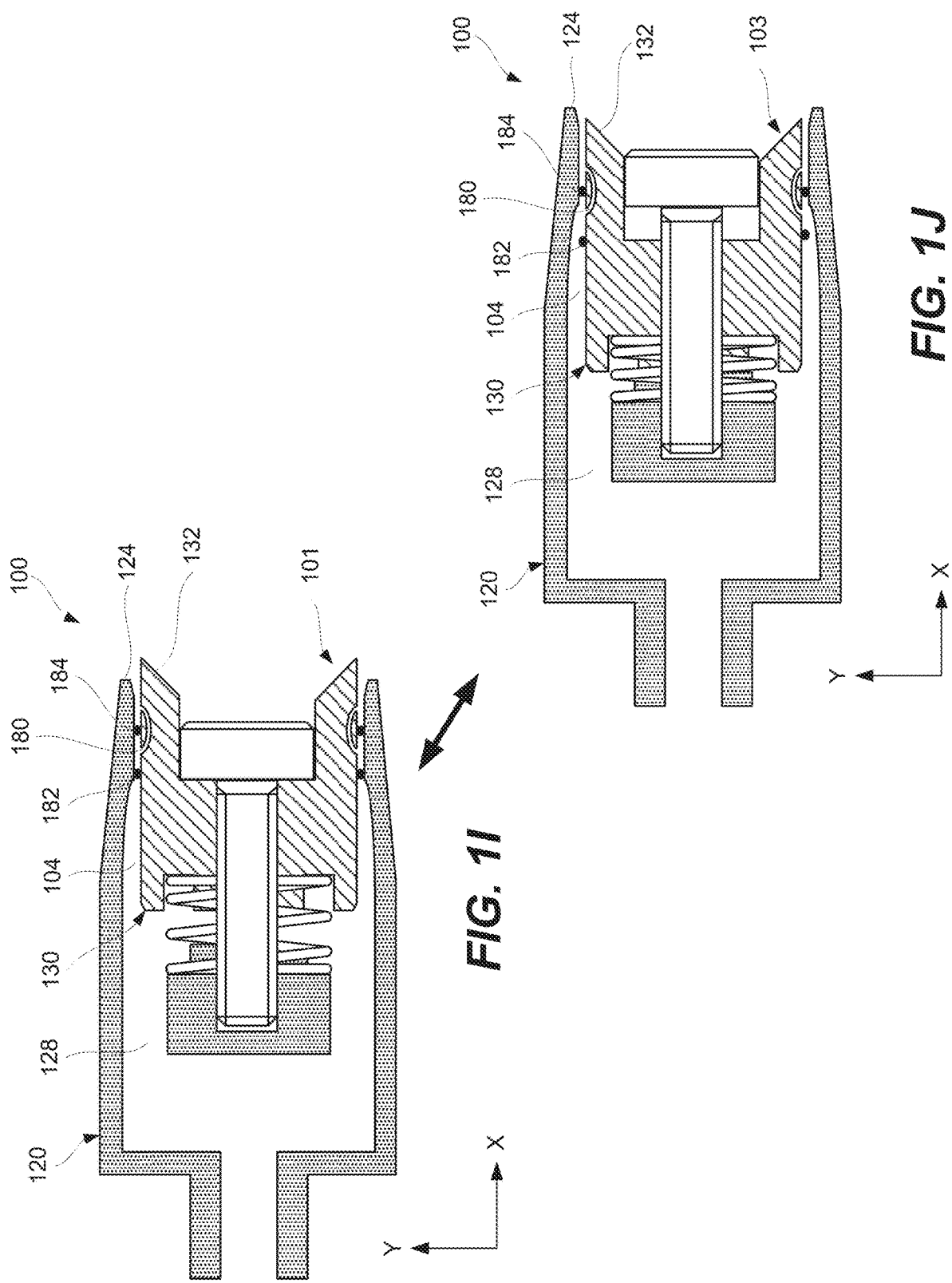

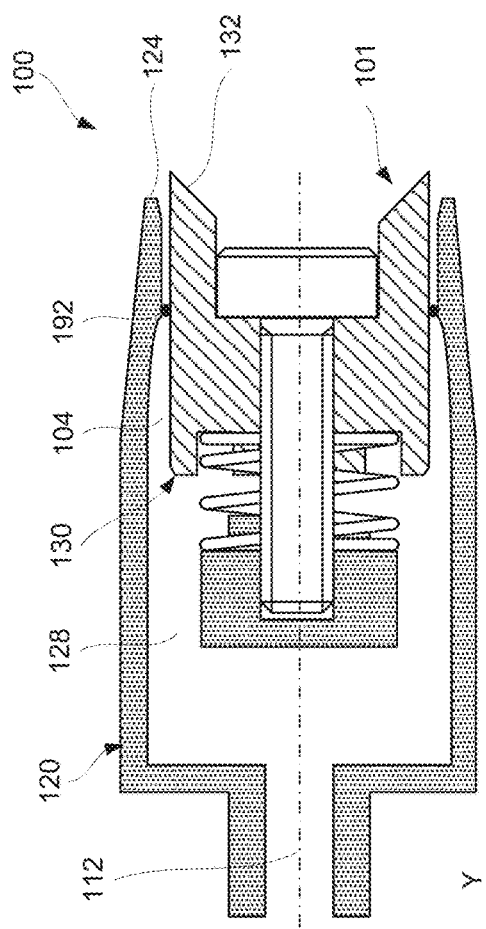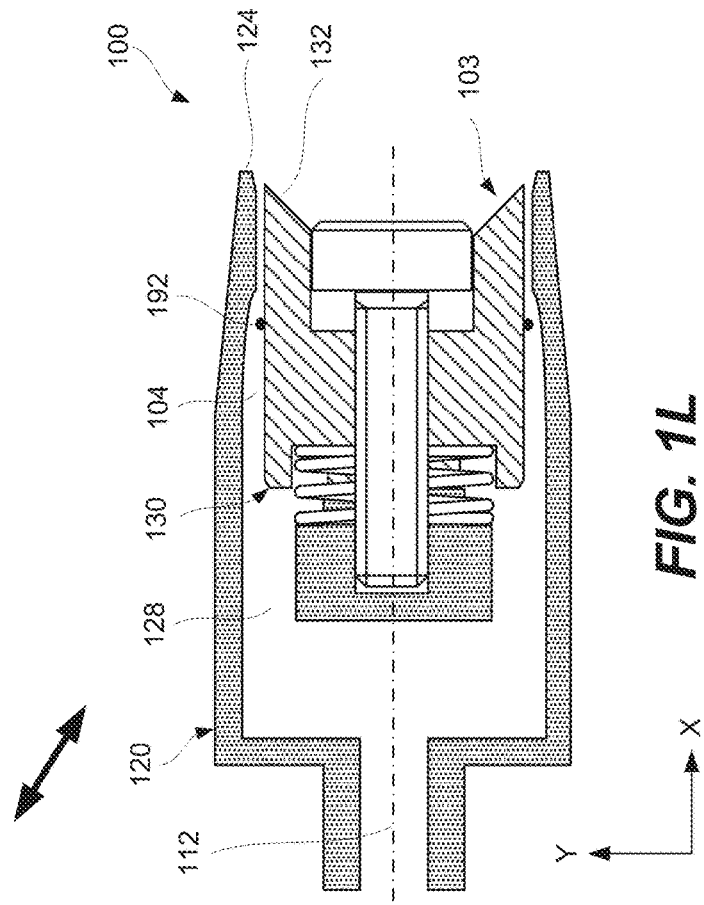

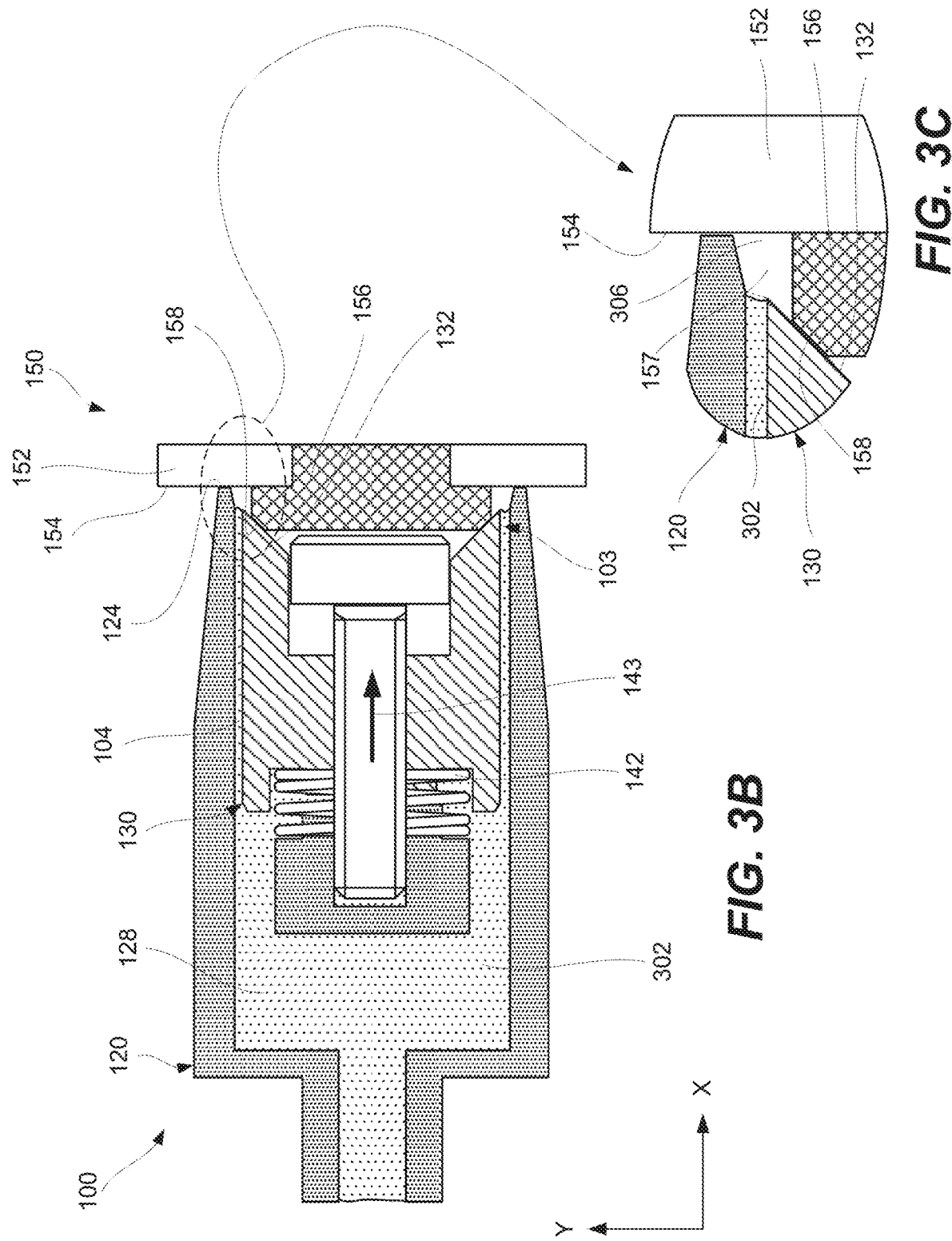

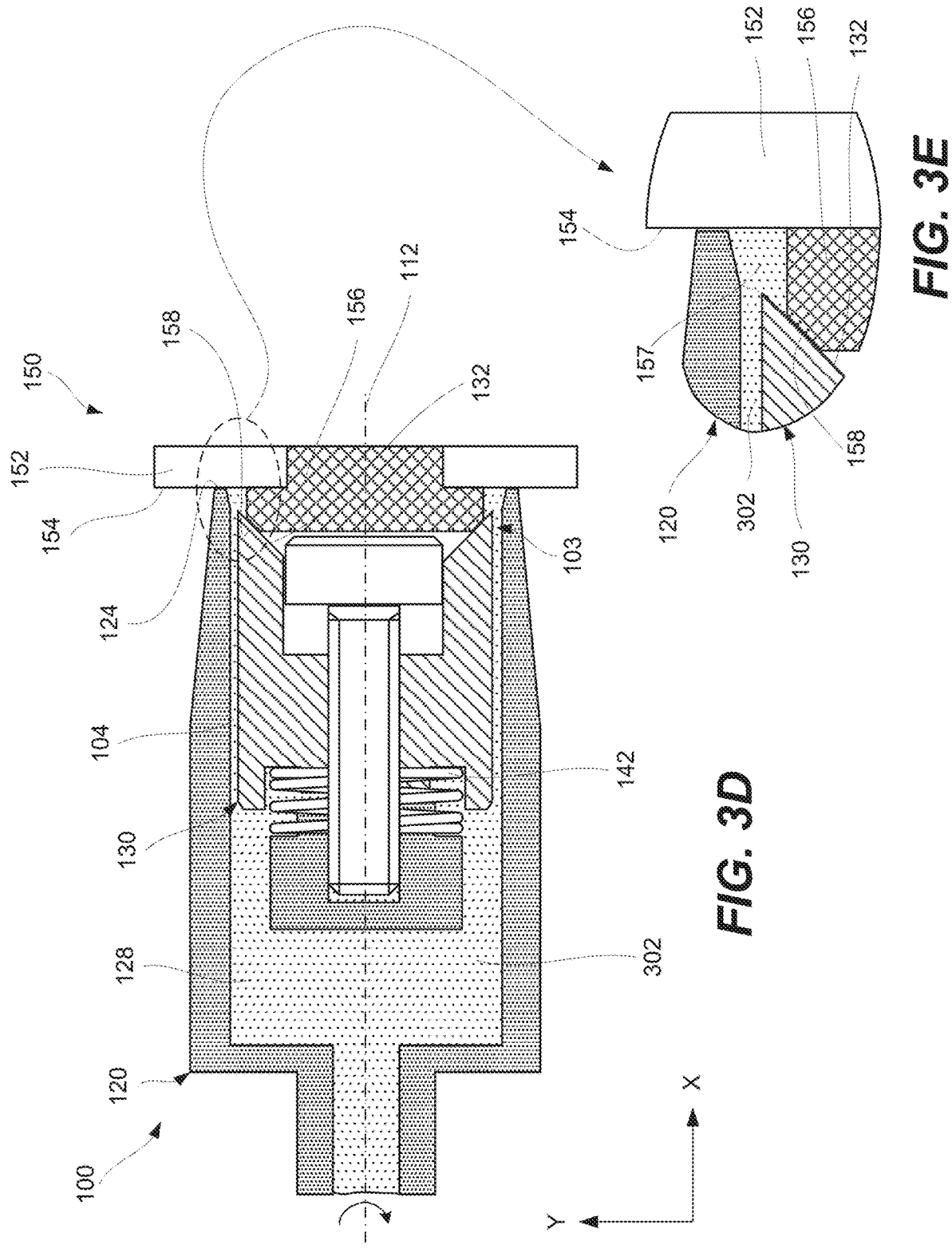

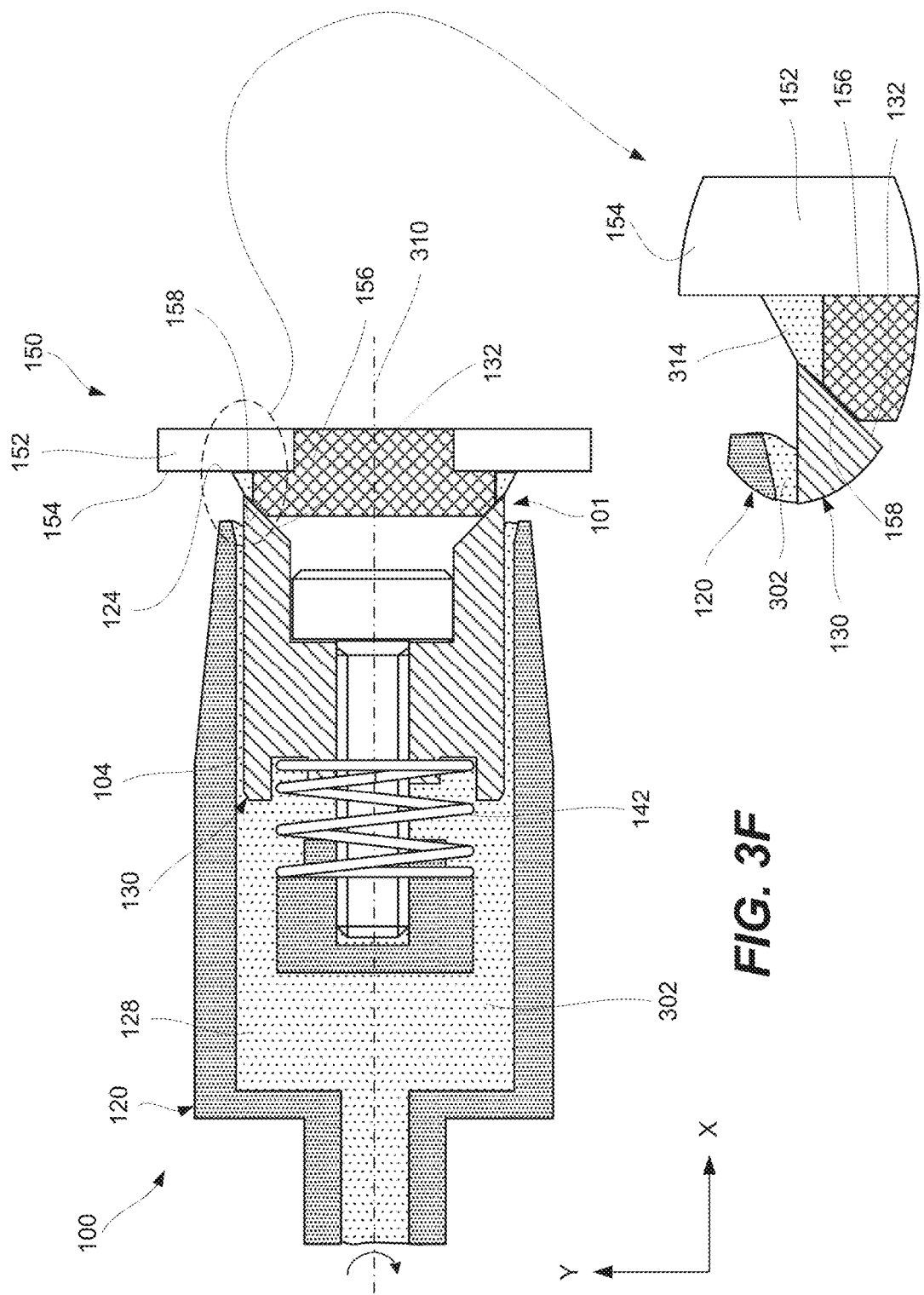

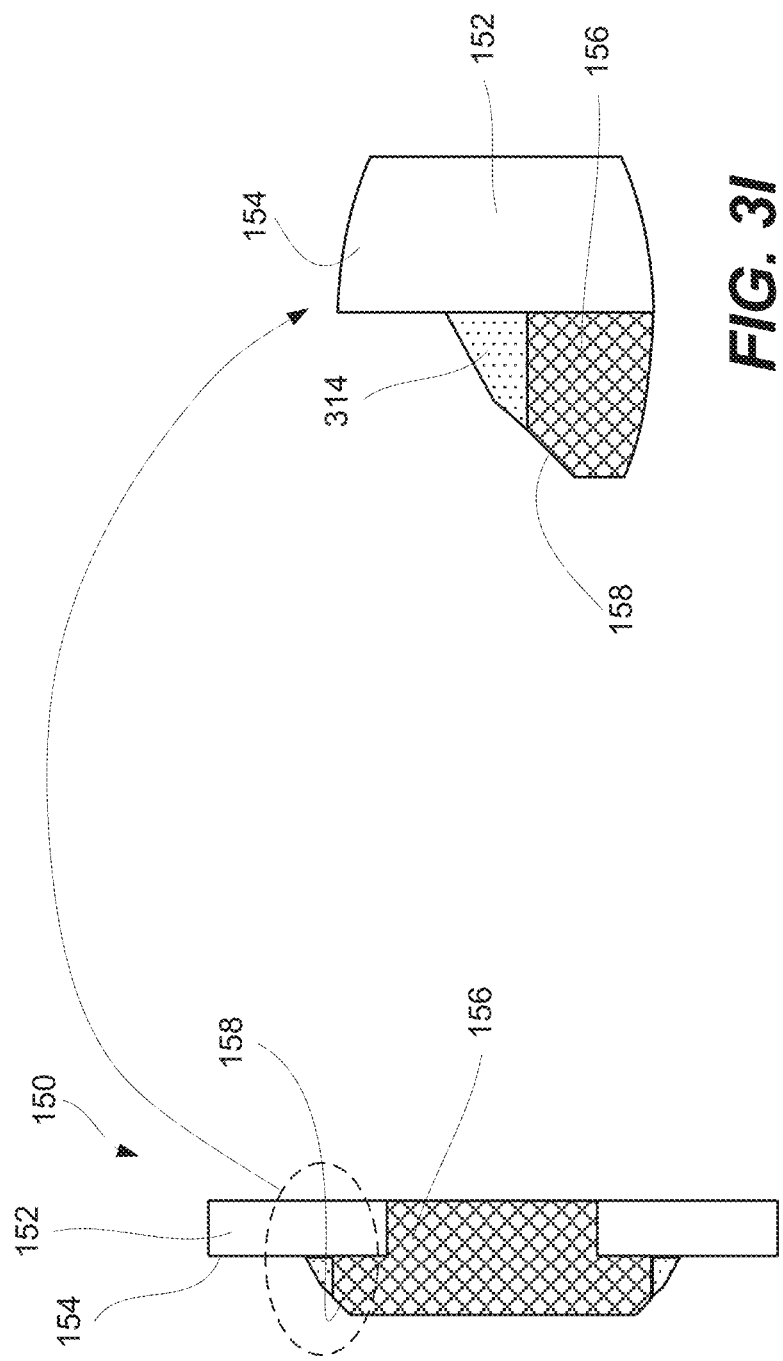

METHODS FOR APPLYING MATERIALS TO INTERFACE AREAS AND APPLICATOR COMPRISING A SURFACE INTERFACE GUIDE FORMING A CONTINUOUS RING-SHAPED FLOW CHANNEL

CROSS-REFERENCE TO RELATED APPLICATION

This application is a divisional of U.S. patent application Ser. No. 14/662,970 entitled: "Systems and Methods for Applying Materials to Interface Areas" filed on Mar. 19, 2015, which is incorporated herein by reference in its entirety for all purposes.

TECHNICAL FIELD

This disclosure generally relates to systems and methods for applying materials on interface areas or, more specifically, to systems and methods using applicators for sealing the interface areas and delivering materials to the interface areas such that component portions outside of these interface areas remain substantially free from the materials.

BACKGROUND

Many interfaces on aircraft structures and other types of structure may be sealed from various environmental elements, such as water, to keep these elements from penetrating through these interfaces and, in some cases, to ensure containment of the internal environment. One example of such interface is an interface between a fastener (e.g., a rivet) and aircraft skin. One area of concern is sealing fasteners inside wings, particularly wings that serve as fuel tanks. Even small gaps may be of concern because a typical commercial aircraft may have thousands of rivets and other fasteners that are sealed. To cover gaps in these interfaces, various sealants may be used during or after installation of the fasteners. For example, a sealant may be deposited onto an internal surface of a skin at an interface area between formed by the skin and fastener. This application is typically performed using a handheld tool and involves manually aligning a dispensing nozzle with the fastener. Furthermore, to cover and fill the interface area with the material, a circular motion may be performed guiding the tip of the dispensing nozzle around the perimeter of the interface. For example, a portion of the fastener interfacing with a planar part may have a round shape defining a ring-shaped interface area. Maintaining the alignment is difficult during this circular motion and some material gets into the areas away from the interface. Furthermore, a similar circular motion may be performed to break the flow of the material. Specifically, a circular motion may be performed while retracting the application tool and separating the application tool from the applied material or, more specifically, in order to separate/break the application string of sealant from the dispensing nozzle. This circular motion is similar to the motion used to finish off application of soft ice cream into an ice cream cone. This application generally results in the fastener being fully covered with the sealant and not just the interface area. There are a few concerning issues with this approach.

The manual alignment and circular motions performed during application of a sealant take a significant amount of time. This time can be very extensive when viewed in light of the many thousands of fasteners that are being sealed on the same aircraft. This time results in added cost. Furthermore, the use of a handheld tool results more sealant than necessary being deposited to cover the interfaces. This excess is costly from the material consumption perspective. It also adds excessive weight to the resulting assembly often as much as 20-50 pounds for the same aircraft for the sealed fasteners. In some cases, the handheld tool and even robotic tools may be difficult to align with the rest to the sealing area and some gaps may remain exposed even when excessive amounts of sealant are deposited. Finally, fasteners that are not properly sealed may be reworked, which adds considerable time and cost to the manufacturing process.

SUMMARY

Provided are methods and systems for applying materials to interface areas formed by fasteners and parts. Specifically, a material is applied to an interface area while portions of the fastener and part outside of this interface area remain substantially free from the material. For purposes of this disclosure, an interface area is defined as an area including and surrounding the interface (e.g., a seam) between the part and fastener and covering gaps in this interface. The interface area also includes surrounding portions of the part and fastener forming this interface. The size and share of the interface area may depend on the geometry of the part and fastener, on the size and shape of the interface, and/or on the amount and properties of the material used at this interface to achieve various functions, such as sealing, bonding, and the like. When the material is applied into the interface area, the interface area may be sealed off from the remaining portions of the part and fastener by the applicator or, more specifically, by applicator's housing and inner guide. As such, a controlled amount of the material is dispensed in a precise location defined by the interface area. The material may be delivered through an annular flow channel between the housing external wall and inner guide. The inner guide may be sealingly engaged with the fastener and, in some embodiments, the inner guide may be centered with respect to the fastener. The housing may be sealingly engaged with respect to the part and, in some embodiments, may be rotated with respect to the part to redistribute the material at the interface area.

In some embodiments, an applicator is configured to form a deposit of a material in an interface area. The interface area may be formed by a fastener and a part and may have a ring shape. The deposit is contained within the interface area while maintaining a portion of the fastener free (outside of the interface area) from the material.

In some embodiments, the applicator includes a housing and inner guide. The housing defines a cavity. The inner guide is slidably disposed within the cavity of the housing. The housing and inner guide may form a flow channel within the cavity. More specifically, the flow channel is formed between the internal wall of the inner guide and the external wall of the housing. The flow channel may have a rind shape. More specifically, the shape of the flow channel at the exit may match the shape of the interface area.

In some embodiments, the housing has a housing contact surface for sealingly engaging the part partially defining the interface area. The inner guide may have an inner guide contact surface for sealingly engaging the fastener partially defining the interface area. The inner guide may be configured to slide with respect to the housing between a retracted position and protracted position. A portion of the inner guide may extend outside of the housing beyond the housing contact surface when the inner guide is in its protracted position. In its retracted position, the inner guide may be positioned within the cavity of the housing when the inner guide is in the retracted position.

In some embodiments, the inner guide includes two or more guiding protrusions extending into corresponding guiding recesses of the housing. Alternatively, the housing includes two or more guiding protrusions extending into corresponding guiding recesses of the inner guide. The two or more guiding protrusions and the corresponding guiding recesses define a sliding direction of the inner guide with respect to the housing. In some embodiments, the two or more guiding protrusions do not extend to the housing contact surface, at least when the inner guide is in its retracted position. Specifically, a part of the flow channel extending to the housing contact surface may be continuous, at least when the inner guide is in its retracted position. In other words, the ring shape of a part of the flow channel extending to the housing contact surface is continuous. This part of the flow channel may define the shape of the material formed at the interface area between the part and fastener.

In some embodiments, the flow channel is restricted when the inner guide is in its protracted position. Various features, such as channel sealing mechanisms, may be provided on the inner guide and/or the housing to restrict the flow channel as further described below. In some embodiments, a channel sealing mechanism may be also operable as a retaining mechanism that keeps the inner guide from sliding put of the housing beyond its protracted position.

In some embodiments, the inner guide is porous. Specifically, the inner guide may be configured to pass the material through the inner guide. For example, the inner guide may be formed from open-cell foam.

In some embodiments, the applicator also includes a biasing mechanism disposed between the housing and the inner guide. The biasing mechanism may urge the inner guide from the retracted position into the protracted position. One example of the biasing mechanism is a spring.

In some embodiments, the applicator also includes a retaining mechanism keeping the inner guide from protracting outside of the housing beyond the protracted position. For example, the retaining mechanism may be a bolt protruding through the inner guide and being threadably attached to the housing. The inner guide may be slidably disposed on the bolt and configured to slide on the bolt between the retracted position and protracted position. In another example, a retaining mechanism may block the flow channel when the inner guide in in the protracted position.

In some embodiments, the applicator also includes a rotational mechanism for rotating the housing with respect to the part and, in some embodiments, with respect to the inner guide. The rotation may be performed when the inner guide sealingly engages the fastener. During this rotation, the inner guide may be stationary with respect to the fastener.

Provided also is a method for depositing a material in an interface area, according to some embodiments. The method may involve forming a deposit of the material having a continuous ring shape. The deposit is formed simultaneously around the entire perimeter of the interface area. The deposit is formed by flowing the material through a flow channel of an applicator onto the interface area. The interface area is defined by a fastener and a part.

In some embodiments, prior to forming the deposit, the method also involves sealing the interface area formed by a fastener and part from a remaining surface of the fastener and a remaining surface of the part. The remaining surface of the fastener is positioned outside of the interface area, and the remaining surface of the part is also positioned outside of the interface area.

In some embodiments, sealing the interface area involves sealingly engaging the fastener with, for example, the inner guide of an applicator or, more specifically, with the inner guide sealing surface. The inner guide may be in its protracted position. In some embodiments, a portion of the inner guide may extend outside of a housing of the applicator. Sealingly engaging the fastener may also align the applicator with respect to the fastener.

In some embodiments, sealing the interface area may also involve sealingly engaging the part with, for example, the housing of the applicator or, more specifically, with the housing sealing surface. During this operation, the inner guide slides with respect to the housing from its protracted position to its retracted position.

After forming the deposit, the method may continue with exposing the interface area having the deposit. In some embodiments, exposing the interface area may involve disengaging the part from the applicator and subsequently disengaging the fastener from the applicator. After exposing the interface area, the remaining surface of the fastener and the remaining surface of the part beyond interface area may be substantially free from the material. The remaining surface of the fastener and the remaining surface of the part are positioned outside of the interface area.

BRIEF DESCRIPTION OF THE DRAWINGS

Figure 1A:
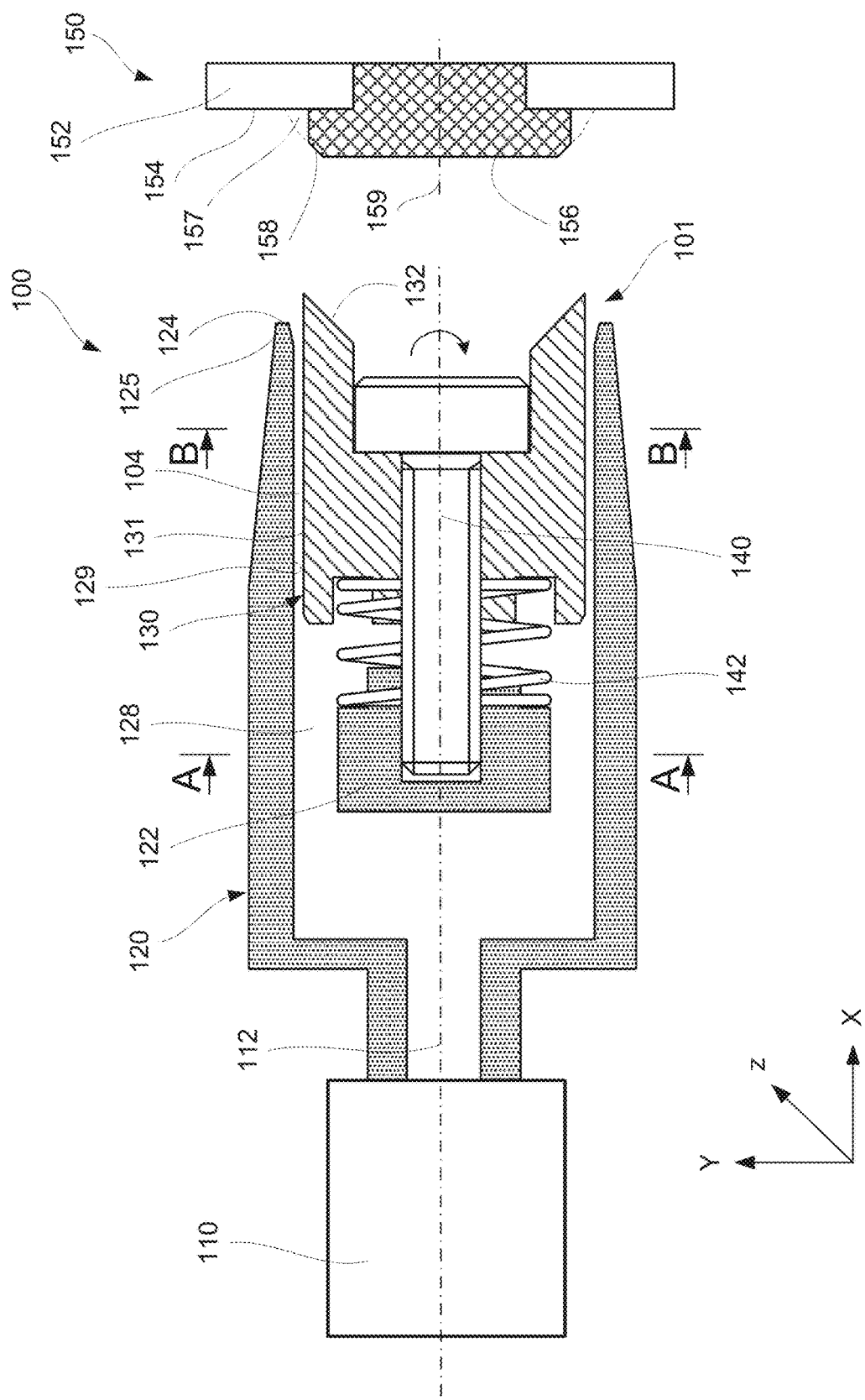

Having thus described examples of the disclosure in general terms, reference will now be made to the accompanying drawings, which are not necessarily drawn to scale, and wherein like reference characters designate the same or similar parts throughout the several views, and wherein:

FIG. 1A is a schematic cross-sectional representation of an applicator illustrating various internal components of the applicator, in accordance with some embodiments.

Figure 1C:
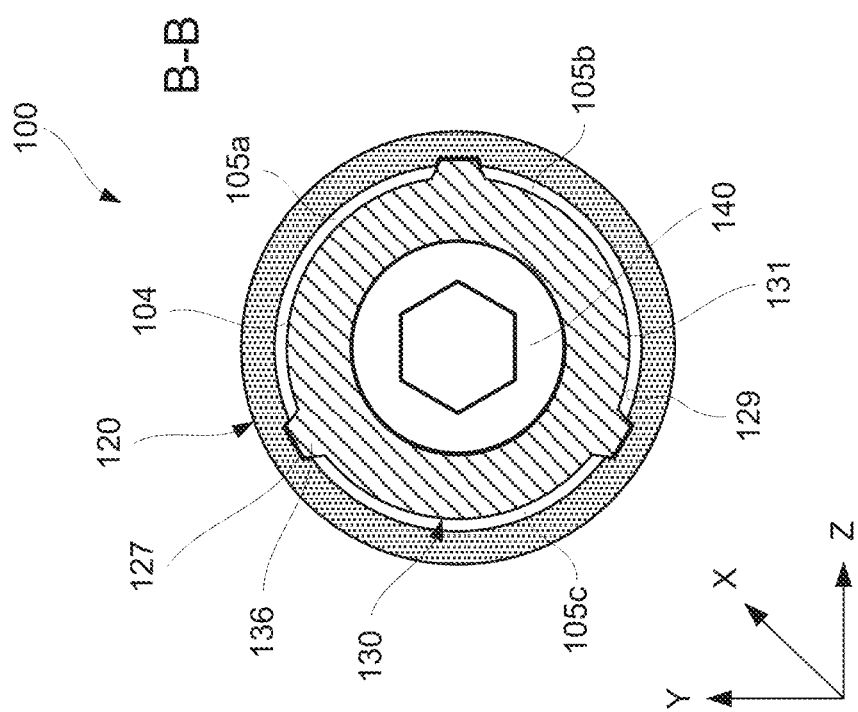
Figure 1B:
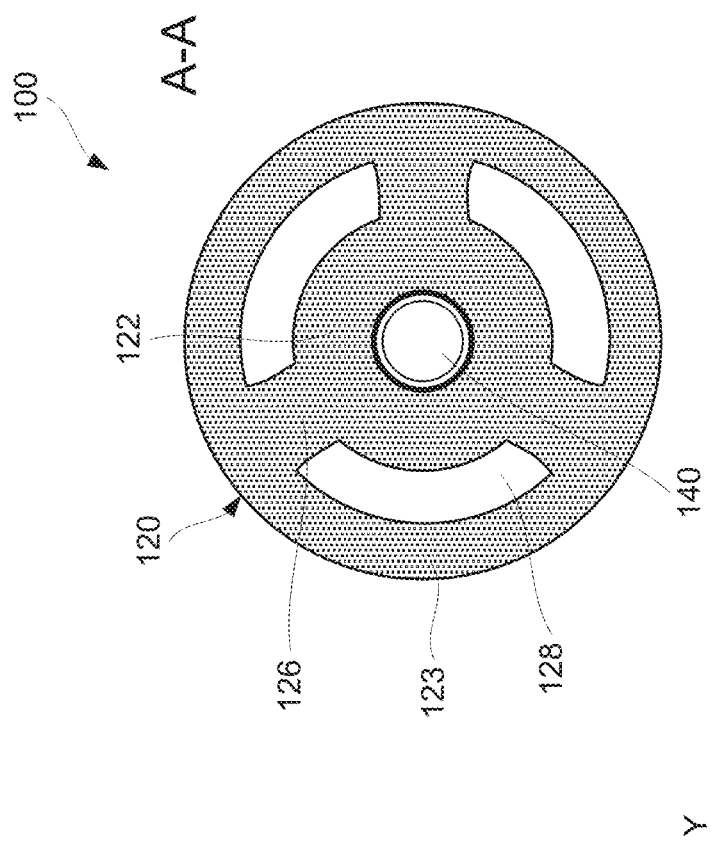

FIGS. 1B and 1C are two schematic cross-sectional representations of the applicator shown in FIG. 1A at different locations along the length of the applicator, in accordance with some embodiments.

Figure 1D:
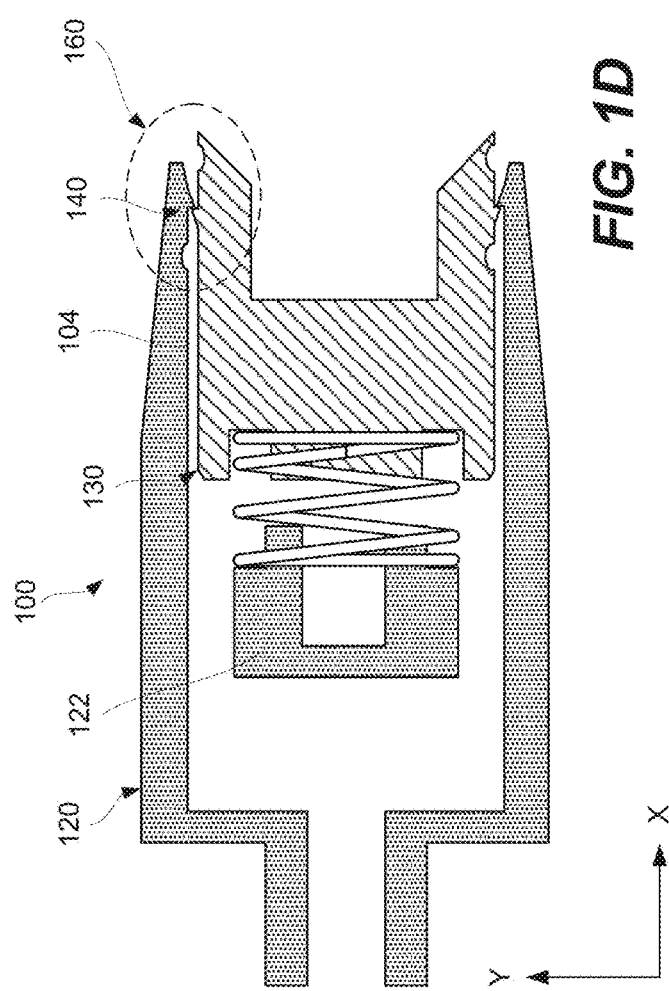

FIG. 1D is a schematic cross-sectional representation of the applicator including a different retaining mechanism operable to restrict a flow channel of the applicator, in accordance with some embodiments.

Figure 1F:
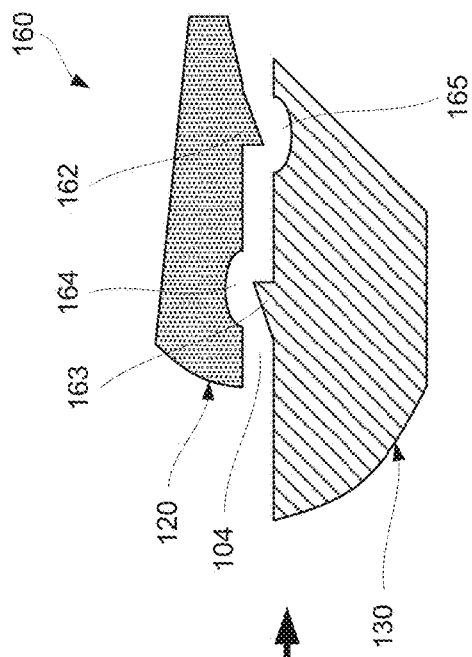
Figure 1E:
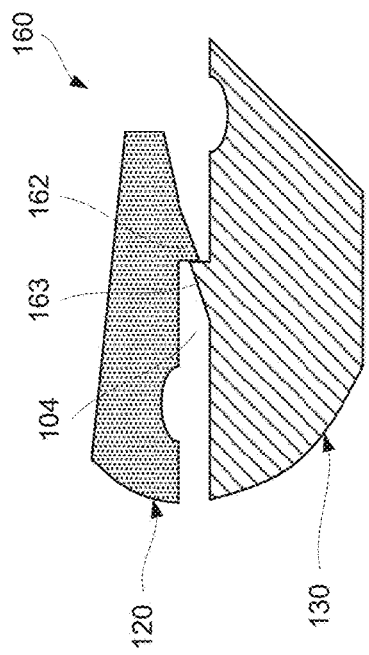

FIGS. 1E and 1F are schematic expanded views of a portion of the applicator of FIG. 1D further illustrating various features of the retaining mechanism with the inner guide shown in its retracted and the protracted position, in accordance with some embodiments.

Figure 1G:
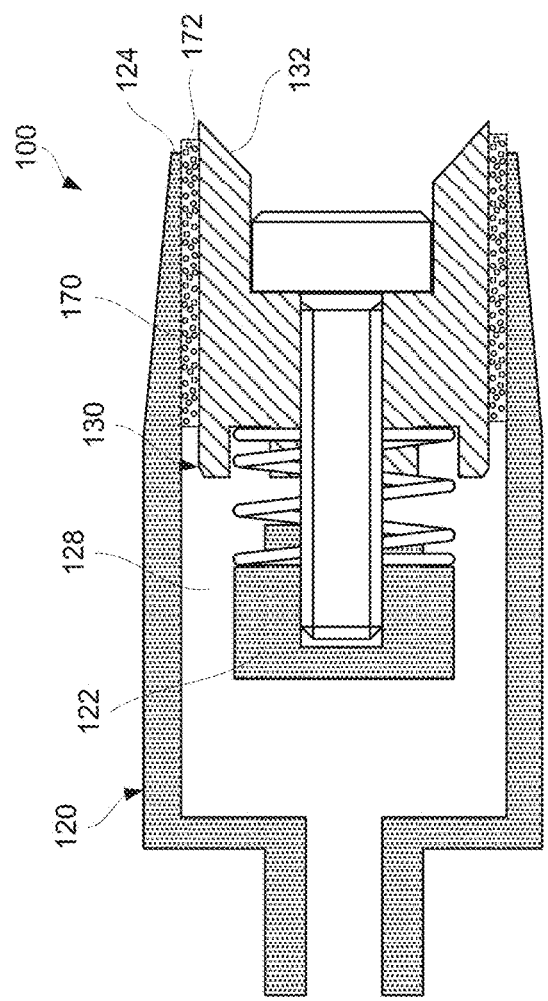

FIG. 1G is a schematic cross-sectional representation of the applicator including the inner guide and a foam insert positioned in the flow channel of the applicator, in accordance with some embodiments.

Figure 1H:
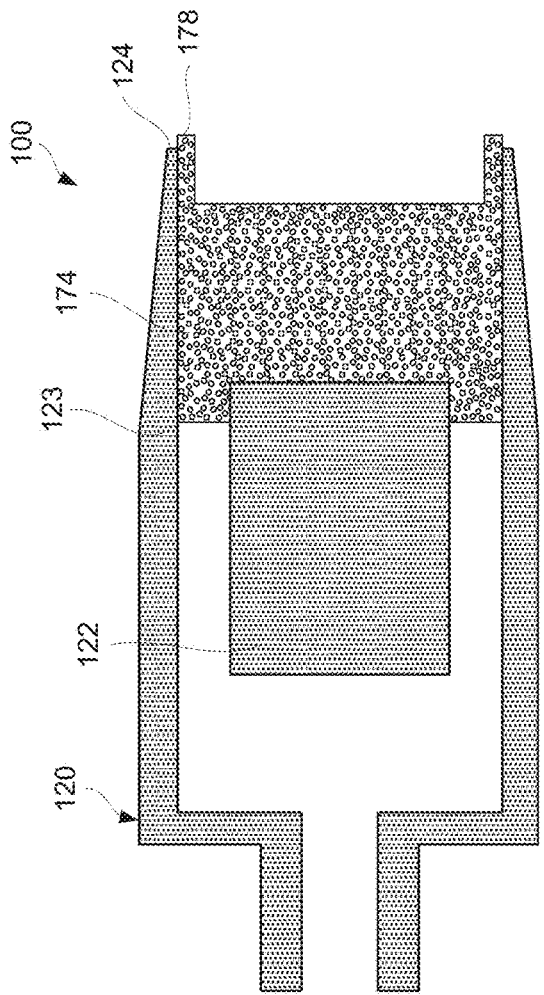

FIG. 1H is a schematic cross-sectional representation of the applicator with the inner guide made from a foam material, in accordance with some embodiments.

FIGS. 1I and 1J are schematic cross-sectional representations of the applicator including a channel sealing mechanism with the inner guide shown in the protracted position and the retracted position, respectively, in accordance with some embodiments.

FIGS. 1K and 1L are schematic cross-sectional representations of the applicator including a different channel sealing mechanism with the inner guide shown in its protracted position and the retracted position, respectively, in accordance with some embodiments.

Figure 1M:
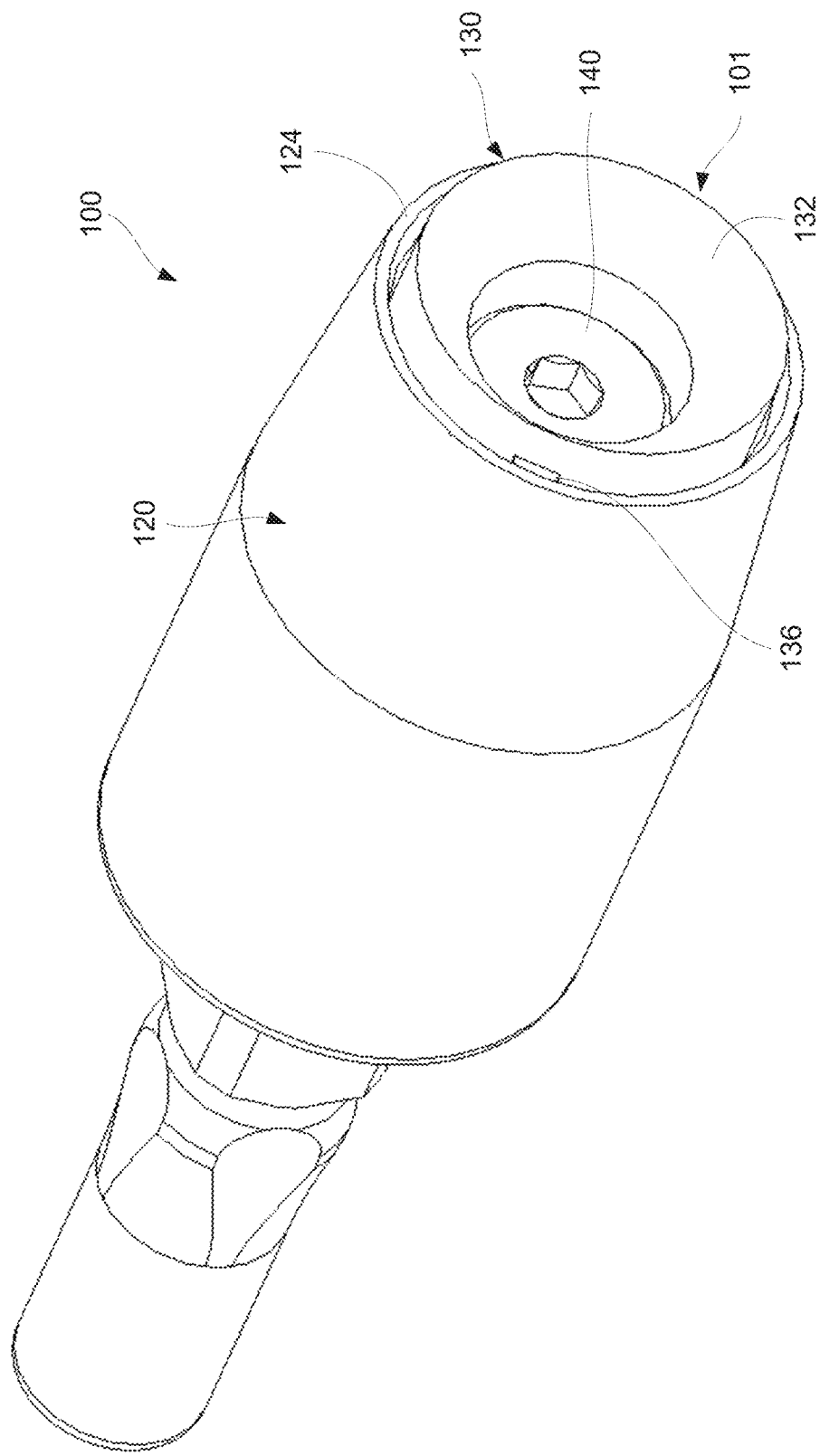

FIG. 1M is a schematic perspective representation of the applicator including guide protrusion, in accordance with some embodiments.

Figure 2:
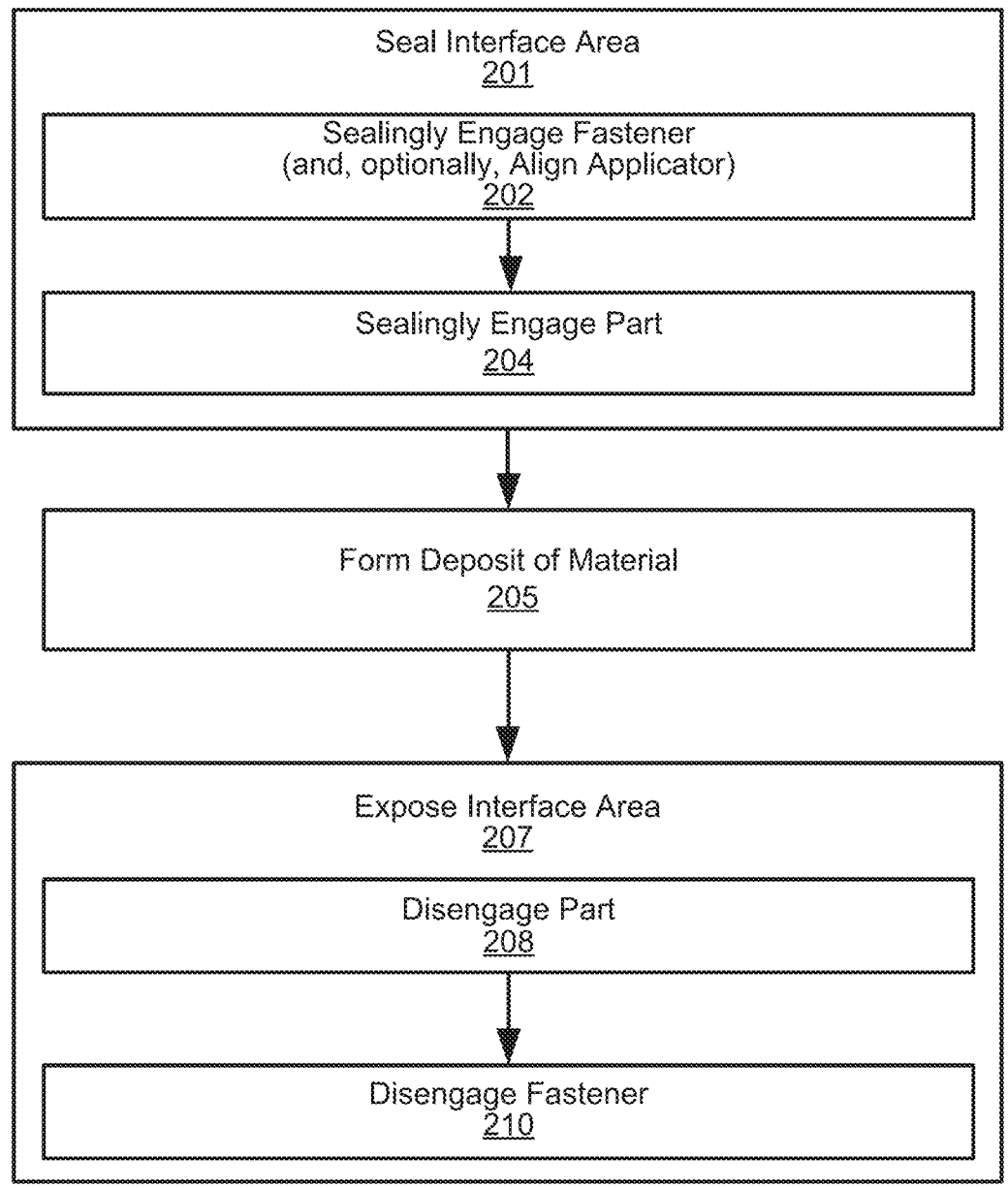

FIG. 2 is a process flowchart corresponding to a method for applying a material to an interface area, in accordance with some embodiments.

Figure 3A:
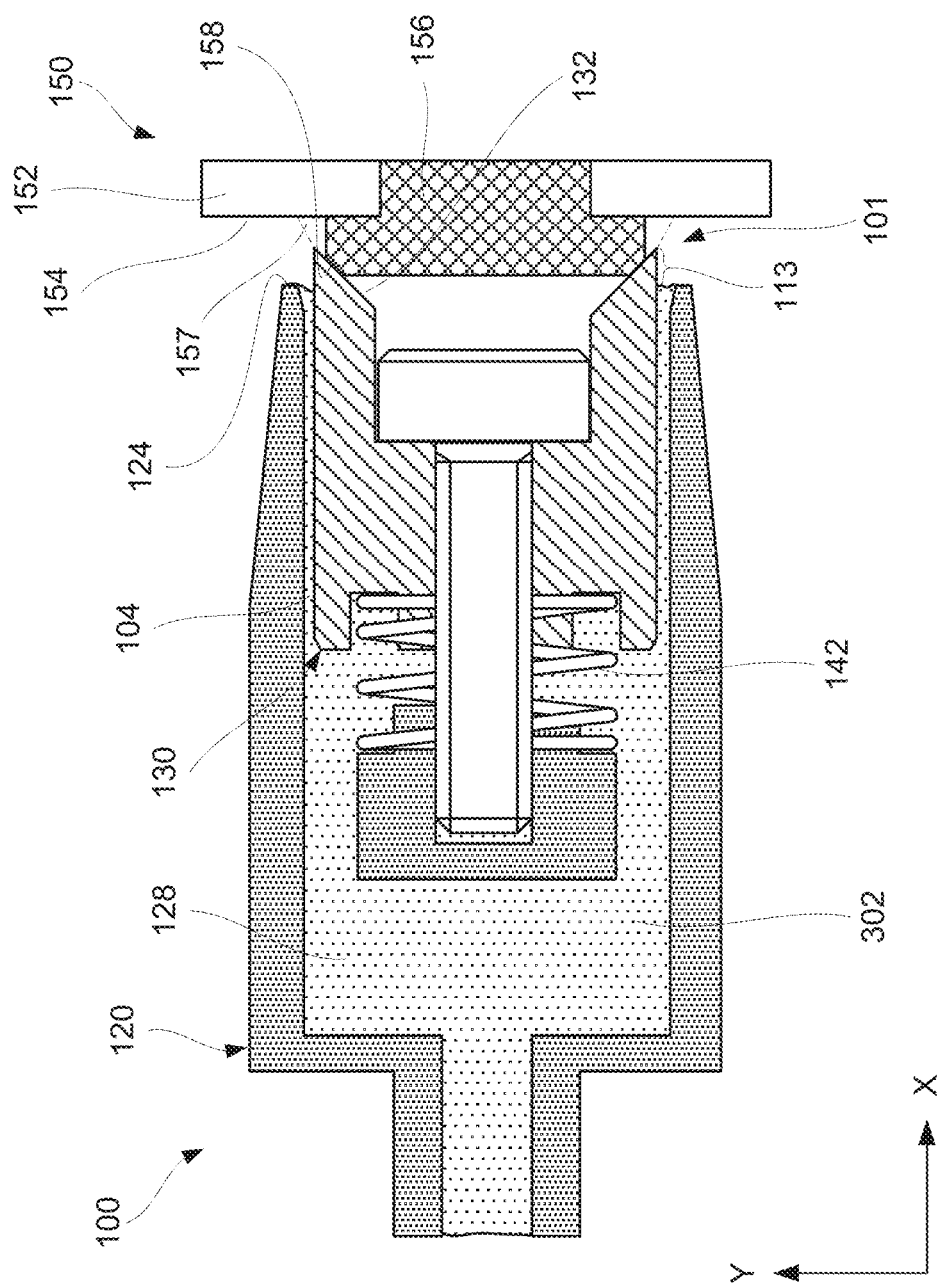

FIG. 3A is a schematic cross-sectional representation of the applicator and the fastener assembly after sealingly engaging the fastener with the inner guide contact surface of the inner guide of the applicator, in accordance with some embodiments.

FIG. 3B is a schematic cross-sectional representation of the applicator and the fastener assembly after sealingly engaging the part with the housing contact surface of the housing, in accordance with some embodiments.

FIG. 3C is a schematic expanded view of a portion identified in FIG. 3B and illustrating the interface area sealed and isolated from the remaining portions the fastener and the part of the fastener assembly shown in FIG. 3B, in accordance with some embodiments.

FIG. 3D is a schematic cross-sectional representation of the applicator and the fastener assembly after delivering the material to the interface area, in accordance with some embodiments.

FIG. 3E is a schematic expanded view of a portion identified in FIG. 3D showing the interface area filled with the materials, in accordance with some embodiments.

FIG. 3F is a schematic cross-sectional representation of the applicator and the fastener assembly after disengaging the part from the housing contact surface of the housing, in accordance with some embodiments.

FIG. 3G is a schematic expanded view of a portion identified in FIG. 3F, in accordance with some embodiments.

FIG. 3H is a schematic cross-sectional representation of the fastener assembly after the applicator is disengaged from the fastener assembly and the interface area is filled with the materials and is exposed, in accordance with some embodiments.

FIG. 3I is a schematic expanded view of a portion identified in FIG. 3H, in accordance with some embodiments.

Figure 4:
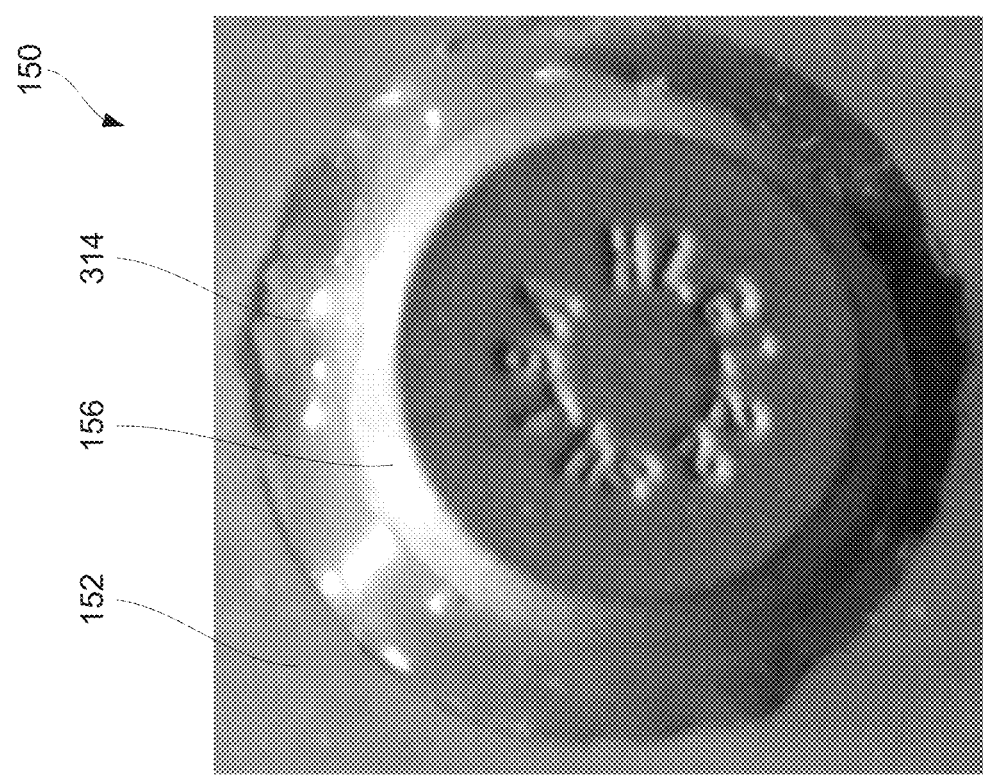

FIG. 4 is a photograph of a test fastener assembly having a material applied to the interface area of the assembly, in accordance with material application techniques described herein.

Figure 5:
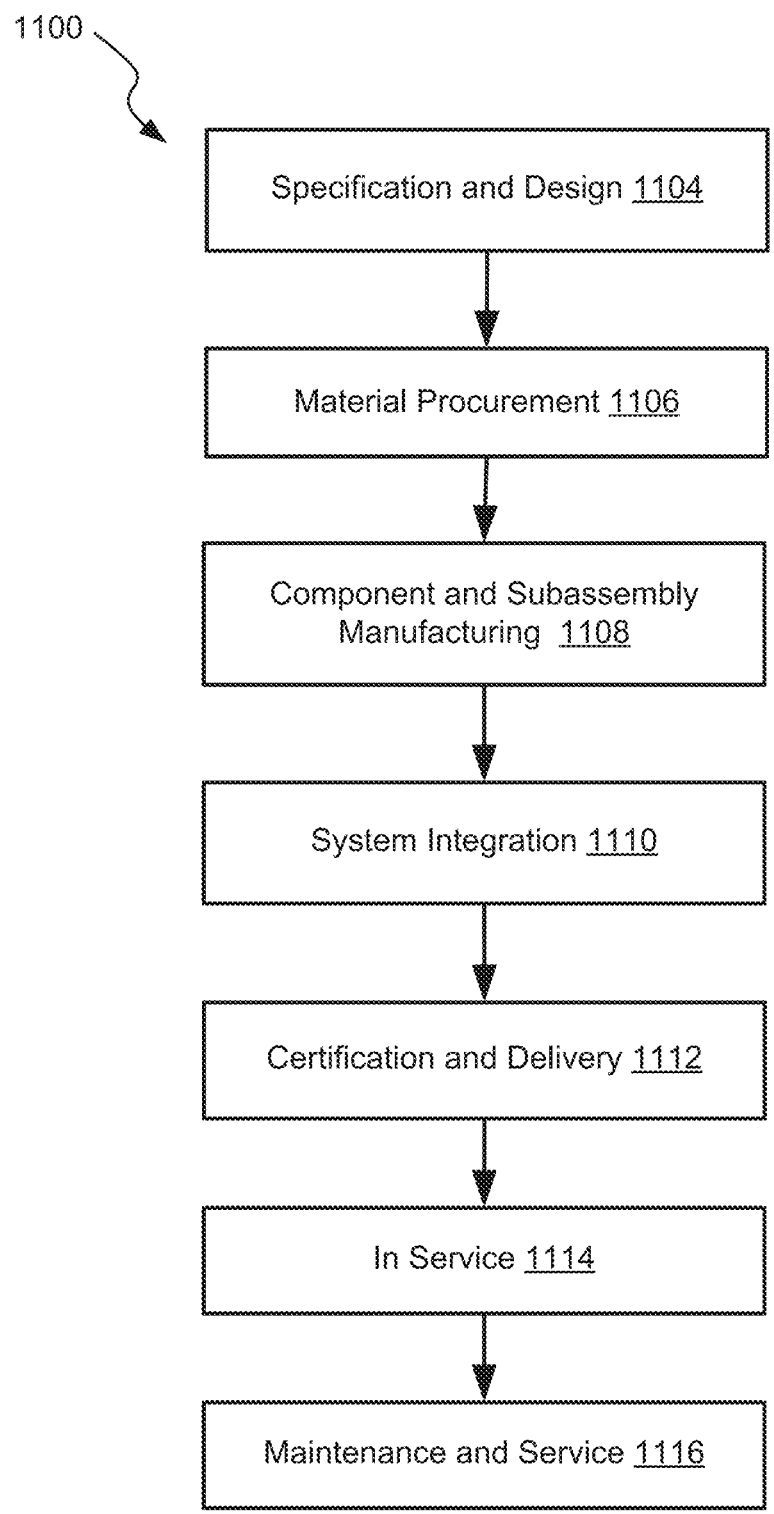

FIG. 5 is a diagram of an aircraft production and service methodology that may utilize one or more material application systems and methods described herein.

Figure 6:
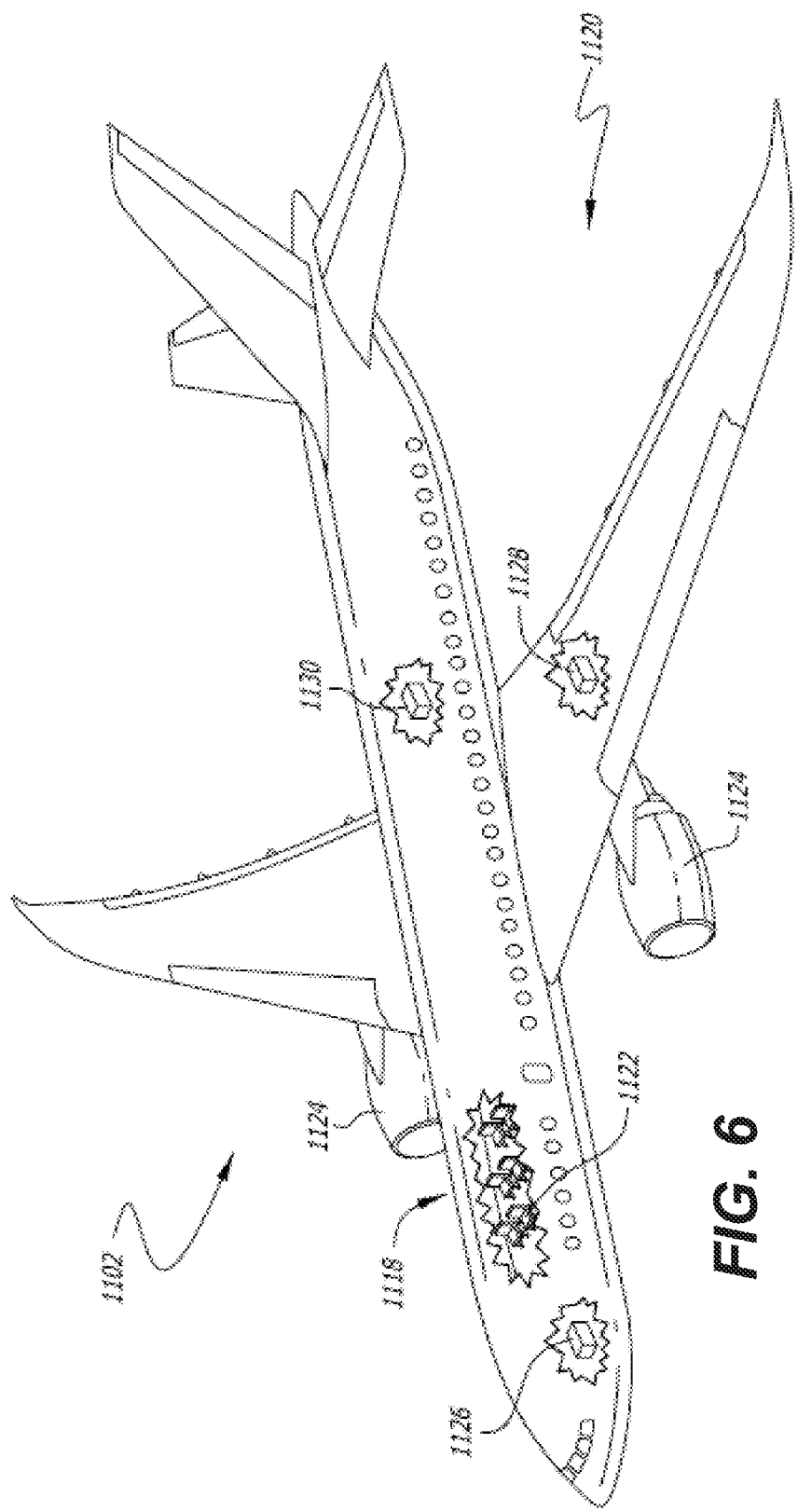

FIG. 6 is a schematic illustration of an aircraft that may utilize parts and fasteners with their interfaces sealed using material application systems and methods described herein.

DETAILED DESCRIPTION

In the following description, numerous specific details are set forth in order to provide a thorough understanding of the presented concepts. The presented concepts may be practiced without some of these specific details. In other instances, well known process operations have not been described in detail so as to not unnecessarily obscure the described concepts. While some concepts will be described in conjunction with the specific examples, it will be understood that these examples are not intended to be limiting.
Introduction As noted above, applying viscous liquids, slurries, and other similar types of materials to specific areas in a relatively fast and precise manner is a challenging task. These applied materials may be used for sealing interfaces or other purposes bonding) such that the materials sufficiently cover these interfaces and have no voids or gaps. Provided are methods and systems for applying materials to interface areas between fasteners and parts. Specifically, a material is applied to an interface area such that at least a portion of the fastener remains free from the material. This portion of the fastener extends outside of the interface area. The interface area may be sealed such that the material is not spread beyond the designated and contained space. As such, a controlled amount of the material is dispensed in a precise location. An applicator used for this process may include a housing and inner guide slidably disposed within this housing. The material may be delivered through an annular flow channel between the housing wall and the inner guide. The inner guide may be sealingly engaged with and, in some embodiments, centered with respect to the fastener. The housing may be sealingly engaged with respect to the part and, in some embodiments, may be rotated with respect to the part to redistribute the material at the interface area.

This applicator may be used to apply various materials, such as sealants, adhesives, and other like materials. Even with smaller amounts of applied material, it may fill gaps within the interface area. At the same time, excessive material is not deposited in other areas away from the interface. Furthermore, the material may be redistributed within the interface area to ensure the material deposit being void-free and gap-free. In some embodiments, the material applied to the interface area may have a shape of a circular fillet around the base of the fastener head. While references may be made to sealing an interface between the fastener head and part, one having ordinary skills in the art that this disclosure is not limited to any particular examples unless specifically claimed. For example, a sealing interface may be between a nut of the fastener and part such that the nut is disposed inside the aircraft (e.g., the part may be an aircraft skin). Other applications and sealing interfaces are also within the scope.

The proposed methods and systems help to reduce amounts of deposited materials resulting in weight reduction and costs savings. Furthermore, these methods and systems substantially reduce the processing time in comparison, for example, to manual application techniques currently used in many industries. For example, the proposed method and systems render unnecessary a breakoff operation or a circular motion often used in a conventional operation technique. Finally, these methods and systems ensure void-free and gap-free sealing of the interface.

Apparatus Examples

FIG. 1A is a schematic cross-sectional representation of applicator 100 illustrating details and arrangement of various internal components of applicator 100, in accordance with some embodiments. Fastener assembly 150 including fastener 156 and part 152 is shown in this figure for reference and is not a part of applicator 100. Applicator 100 is configured to apply a material at interface area 157 (shown with dotted lines in FIG. 1A) between fastener 156 and part 152 while maintaining a portion of fastener 156 outside of interface area 157 free from the applied material. Furthermore, a portion of part 152 outside of interface area 157 is also maintained free from the applied material. Interface area 157 may have a shape of a fillet or have other suitable shapes providing sealing and other characteristics.

Material 302 disposed within applicator 100 and later dispensed into interface area 157 is shown in FIGS. 3A-I further described below. In some embodiments, material 302 applied to interface area 157 may be a sealant. Fastener 156 may be a rivet, bolt, HI-LOCK™ (including a threaded pin and a threaded collar, which may an elliptical internal thread shape). In n some embodiments, fastener assembly is a bolt and nut-collar combinations where the lower seam between the bottom of the nut-collar and structure, as well as the top seam between the nut-collar and bolt is sealed. In some embodiments, part 152 may be an aircraft skin. One having ordinary skills in the art would understand that applicator 100 may be used to apply various materials to various types of controlled areas.

Applicator 100 includes housing 120 and inner guide 130. Housing 120 defines cavity 128, which provides space for inner guide 130. Housing 120 has housing contact surface 124 for sealingly engaging part 152 as further described below with reference to FIGS. 2 and 3B-3C. Housing contact surface 124 is positioned on tip 125 of housing 120.

Housing 120 and inner guide 130 form flow channel 140 within cavity 128. Specifically, flow channel 140 is formed between internal wall 129 of housing 120 and external wall 131 of inner guide 130 as, for example, shown in FIGS. 1B and 1C. Flow channel 140 may have a ring shape as further described below with reference to FIG. 1C and other figures.

FIG. 1A also illustrates center axis 112 of housing 120 or, more generally, of applicator 100. In some embodiments, applicator 100 self-centers with respect to fastener 156 such that center axis 112 may coincide with center axis 159 of fastener 156. This self-centering may be achieved when, for example, inner guide 130 sealingly engages fastener 156 or, more specifically, when inner guide contact surface 132 contacts fastener surface 158, as further described below.

Inner guide 130 may be slidably disposed within cavity 128 of housing 120. Inner guide 130 includes inner guide contact surface 132 for sealingly engaging fastener 154 as further described below with reference to FIGS. 2 and 3A. Inner guide 130 may be configured to slide with respect to housing 120 between its retracted position 103 and protracted position 101. For example, inner guide 130 may slide within and with respect to housing 120 along center axis 112. FIG. 1A illustrates inner guide 130 in its protracted position 101. In some embodiments, a portion of inner guide 130 may extend outside of housing 120 beyond housing contact surface 124 in this protracted position 101. This extension may help to initially align inner guide 130 with respect fastener 156 during operation. It should be noted that additional self-alignment between inner guide 130 and respect fastener 156 may occur when inner guide 130 contacts respect fastener 156. Alternatively, inner guide 130 may be positioned within cavity 128 of housing 120 even when inner guide 130 is in its protracted position 101.

FIGS. 3D and 3E illustrate inner guide 130 in its retracted position 103. Generally, inner guide 130 does not extend outside of housing 120 when inner guide 130 is in its retracted position 103. As inner guide 130 moves from its protracted position 101 into its retracted position 103, inner guide 130 moves deeper into cavity 128 of housing 120. In these rear situations, inner guide 130 may extend outside of housing 120 even when inner guide 130 is in its retracted position 103. In some embodiments, inner guide 130 and/or housing 120 is made from a plastic. For example, inner guide 130 and/or housing 120 is rotated with respect to part 152 and fastener 156, the softer material of inner guide 130 and/or housing 120 protects part 152 and fastener 156, which may be made from harder materials. For example, part 152 and fastener 156 may be made from metal, while inner guide 130 and housing 120 may be made from plastic. Furthermore, applicator 100 may be disposable.

In some embodiments, applicator 100 also includes biasing mechanism 142 disposed between housing 120 and inner guide 130 or, more specifically, between center support 122 of housing 120 and inner guide 130. Biasing mechanism 142 may urge inner guide 130 from its retracted position 103 into its protracted position 101. One example of biasing mechanism 142 is a spring, such as a coil spring, pneumatic cylinder, foam structure, rubber structure, or alike. During operation, biasing mechanism 142 also helps to sealingly engage inner guide 130 against fastener 156 or, more specifically, to sealingly engage inner guide contact surface 132 against fastener surface 158. Force 143 with which biasing mechanism 142 urges inner guide 130 out of retracted position as shown in FIG. 3B (and into its protracted position 101) may be selected to provide sufficient sealing (e.g., based on the pressure, viscosity, and surface tension of material 302 being delivered into interface area 157 as well geometry of interface area). Furthermore, this force may be selected based on ability to advance inner guide 130 into its retracted position 103 and to sealingly engage housing 120 with part 152. Retaining mechanism 140, such as a bolt as, e.g., shown in FIG. 1A, may extend through biasing mechanism 142, when retaining mechanism 140 is used in applicator 100.

In some embodiments, applicator 100 also includes a retaining mechanism 140 that keeps inner guide 130 from extending outside of housing 120 beyond the protracted position 101 of inner guide 130. For example, retaining mechanism 140 may be a bolt protruding through inner guide 130 and threadably attached to center support 122 of housing 120 as, for example, shown in FIG. 1A. Inner guide 130 may be slidably disposed on retaining mechanism 140 and configured to slide with respect to retaining mechanism 140 between retracted position 103 and protracted position 101.

Another example of retaining mechanism 140 is shown in FIGS. 1D-1F. Specifically, this example of retaining mechanism 140 is formed by guide protrusion 163 and housing protrusion 162. When inner guide 130 is in its protracted position 101 as shown in FIG. 1E, guide radial protrusion 163 contacts housing radial protrusion 162 thereby controlling further motion of inner guide 130 with respect to housing 120. It should be noted that this contact between guide radial protrusion 163 and housing radial protrusion 162 may also restrict (or block) flow channel 104. For example, guide radial protrusion 163 and housing radial protrusion 162 may have a ring shape. This channel blocking may be used to isolate material 302 remaining in flow channel 104 from the environment (e.g., to slow the curing process of material 302 in flow channel 104). As inner guide 130 advances into its retracted position 103 as shown in FIG. 1F, guide radial protrusions 163 may also move away from housing radial protrusion 162, which opens flow channel 104. In some embodiments, when inner guide 130 is in its retracted position 103, the position of guide radial protrusions 163 may coincide with housing recess 164 while housing radial protrusions 162 may coincide with guide recess 165. This feature may be used to maintain a less restricted flow of material 302 through flow channel 104. Other examples of retaining mechanism 140 may include rods, straps, steps, and other like mechanism.

In some embodiments, applicator 100 also includes rotational mechanism 110 for rotating housing 120 with respect to part 152 and, in more specific embodiments, with respect to inner guide 130. The rotation may be performed when inner guide 130 sealingly engages fastener 156 as further described below with reference to FIGS. 2 and 3A-3E. During this rotation, inner guide 130 may be stationary with respect to fastener 156. Rotating mechanism 110 may include an electrical motor, hydraulic motor, pneumatic motor, robotic actuator, or other similar rotating mechanisms. In some embodiments, rotational mechanism 110 may be used to rotate housing 120 during and/or following the delivery of material 302 into interface area 157. This rotation ensures that material 302 is free from voids, gaps, and/or inconsistencies and, for example, a more robust seal is formed by material 302 deposited in interface area 157.

FIG. 1B is a schematic cross-sectional representation of applicator 100 shown in FIG. 1A at a location identified as A-A along the length of applicator 100, in accordance with some embodiments. As shown in FIG. 1B, housing 120 includes center support 122, which may be used to threadably engage retaining mechanism 140 and/or supporting biasing mechanism 142. Center support 122 may connected to external wall 123 of housing 120 using one or more spokes 126. FIG. 1B shows spokes 126 extending through flow channel 104 and equally spaced.

FIG. 1C is another schematic cross-sectional representation of applicator 100 shown in FIG. 1A at a location identified as B-B along the length of applicator 100, in accordance with some embodiments. As shown in FIG. 1C, housing 120 and inner guide 130 may form flow channel 104 for flowing material 302. Specifically, during operation of applicator 100, material 302 flows from applicator 100 to housing contact surface 124 or, more specifically, into interface area 157. In some embodiments, flow channel 104 has an annular shape. More specifically, flow channel 104 may extend around inner guide 130. In some embodiments, one or more guiding protrusions 136 may extend through flow channel 104.

Specifically, inner guide 130 may include two or more guiding protrusions 136 extending into corresponding guiding recesses 127 of housing 120. FIG. 1C illustrates three guiding protrusions 136. One having ordinary skills in the art would understand that any number of guiding protrusions 136 may be used. Guiding protrusions 136 and guiding recesses 127 may define a sliding direction of inner guide 130 with respect to housing 120. In some embodiments, this sliding direction is linear (e.g., the X axis shown in FIG. 1C). Alternatively, guiding protrusions 136 and guiding recesses 127 may be spiral such that housing 120 may rotate with respect to inner guide 130 (around the X axis) while housing 120 being advanced with respect to inner guide 130 (along the X axis). In other words, housing 120 both rotates (e.g., around its center axis) and linearly advances (e.g., along the same axis) respect to inner guide 130 at the same time. While FIG. 1C illustrates guiding protrusions 136 being parts of inner guide 130 and guiding recesses 127 being parts of housing 120, in some embodiments, guiding protrusions 136 are parts of housing 120 while guiding recesses 127 are parts of inner guide 130.

FIG. 1C also illustrates an example in which guiding protrusions 136 restrict (or block) flow channel 104. As such, flow channel 104 is not continuous and its portions 105a-105c are defined and separated by guiding protrusions 136 extend through flow channel 104. In some embodiments, a portion of flow channel 104 extending over interface area 157 during operation of applicator 100 is unobstructed by any guiding protrusions 136 or spokes 126 and have a constant and continuous cross-sectional profile. As such, flow channel 104 has a continuous ring structure. More specifically, two or more guiding protrusions 136 do not extend to housing contact surface 124 at least when inner guide 130 is in its retracted position 103. As such, a part of flow channel 104 extending to housing contact surface 124 may be continuous at least when inner guide 130 is in retracted position 103. One having ordinary skills in the art would understand that this part of flow channel 104 defines the shape of material 302 deposited in interface area 157.

FIG. 1M is a schematic perspective representation of applicator 100 shown in FIG. 1A, in accordance with some embodiments. Inner guide 130 is shown protruding from housing 120 indicating that inner guide 130 is in its retracted position 103. Also shown is inner guide contact surface 132. The shape of inner guide contact surface 132 may corresponds to the shape of fastener 156 to, for example, ensure the sealing engagement and, in some embodiments, to ensure alignment of inner guide 130 or, more generally, applicator 100 with respect to fastener 156. Also shown retaining mechanism 140 for inner guide 130. Housing contact surface 124 is identified in this figure. The shape of housing contact surface 124 may correspond to the shape of part 152 to ensure the sealing engagement. Finally, FIG. 1M illustrates includes guide protrusion 136 depicted on inner guide 130. Guide protrusion 136 is discussed above with reference to FIGS. 1D-1F.

FIG. 1G is a schematic cross-sectional representation of applicator 100 that has foam insert 170 positioned in flow channel 104 of applicator 100, in accordance with some embodiments. Foam insert 170 may be used to control delivery of material 302 through flow channel 104 and, in some embodiments, to further dispersed and/or intermix material 302 while material 302 passes through foam insert 170. As such, foam insert 170 may be operable as a static mixer. Foam insert 170 may be made from an open cell foam material. In some embodiments, foam insert 170 may be also used to support inner guide 130 with respect to housing 120. Furthermore, foam insert 170 may be operable as retaining mechanism 140 and/or as biasing mechanism 142. For example, the flexibility of foam insert 170 may be used to move inner guide 130 with respect to housing 120 between retracted position 103 and protracted position 101 of inner guide 130.

Foam insert 170 may have front insert surface 172. During operation of applicator 100, front insert surface 172 may extend into interface area 157 to fill interface area 157 with material 302. More specifically, front insert surface 172 may contact part surface 154 when material 302 is being delivered into interface area 157. In some embodiments, the inner surface of foam insert 170 may contact fastener surface 158 when material 302 is being delivered into interface area 157. This surface contact feature may help to ensure that material 302 is delivered to right part surface 154 and/or fastener surface 158. Furthermore, foam insert 170 may be compressed when contacting part surface 154 and/or fastener surface 158. It should be also noted that front insert surface 172 may extend into interface area 157, material 302 may continue to be delivered while housing 120 is being disengaged from part 152. The distribution of material 302 is controlled by the shape of foam insert 170. In other words, material 302 may not be distributed beyond areas immediately surrounding foam insert 170.

FIG. 1H is a schematic cross-sectional representation of applicator 100 having foam reservoir 174 operable as an inner guide. Foam reservoir 174 may function similar to foam insert 170 described above with reference to FIG. 1G. Specifically, foam reservoir 174 may be used to control delivery of material 302 and, in some embodiments, to further dispersed and/or intermix material 302. Foam reservoir 174 may be made from an open cell foam material. In some embodiments, foam reservoir 174 expands when filled with delivered material 302. Unlike an applicator with foam insert 170, applicator 100 having foam reservoir 174 does not have a separate inner guide.

Foam reservoir 174 may include reservoir front surface 178. Foam reservoir 174 delivers material 302 into interface area 157 when, for example, reservoir front surface 178 extends into interface area 157 or, more specifically, contacts fastener surface 158 and/or part surface 154 within interface area 157. Foam reservoir 174 may be supported by external wall 123 of housing 120 and/or center support 122 of housing 120.

In some embodiments, applicator 100 is a disposable applicator. Specifically, applicator 100 may be disposed when material 302 delivered by applicator 100 starts curing inside applicator 100, for example, after applicator 100 is not used for a prolonged period of time, which depends on the curing characteristics of material 302. In some embodiments, curing of material 302 inside applicator 100 may be slowed down or even completely stopped by isolating material 302 remaining in applicator 100 from the environment. One example of features used to seal channel 104 is described above with reference to FIGS. 1D-1F. Additional examples of such features are presented in FIGS. 1I-1L. Another reason to dispose applicator 100 is, for example, when applicator 100 becomes clogged even before material 302 cures.

Specifically, FIGS. 1I and 1J are schematic cross-sectional representations of applicator 100 including a channel sealing mechanism formed by first seal 182, second seal 184, and bypass 180. In this example, first seal 182 and second seal 184 are attached to or at least movable together with inner guide 130. Furthermore, bypass 180 is provided in with inner guide 130. Bypass 180 interconnects a portion of flow channel 104 positioned between first seal 182 and second seal 184 a portion of flow channel 104 positioned between second seal 184 and inner guide contact surface 132. One having ordinary skills in the art would understand that in other embodiments first seal 182, second seal 184, and bypass 180 may be parts of housing 120.

FIG. 1I illustrates applicator 100 with inner guide 130 shown in its protracted position 101. In this position first seal 182 restricts (and, in some cases, blocks) flow channel 104 such that material 302 cannot flow from cavity 128 to housing contact surface 124. As such, no material 302 can be delivered when inner guide 130 is in its protracted position 101. At the same time, any material 302 within cavity 128 is isolated from the environment by first seal 182. Any material 302 remaining between first seal 182 and housing contact surface 124 may be flushed out prior to subsequent use of applicator 100.

FIG. 1J illustrates applicator 100 with inner guide 130 shown in its retracted position 103. In this position second seal 184 also restricts (and, in some cases, blocks) flow channel 104. Material 302 can flow from cavity 128 to housing contact surface 124 through bypass 180. As such, bypass 180 may be viewed as a part of flow channel 104 in this position of inner guide 130.

FIGS. 1K and 1L are schematic cross-sectional representations of applicator 100 with channel 104 being sealed using main seal 192 connected to or at least movable together with inner guide 130. In these embodiments, flow channel 104 has a different profile along center axis 112. Specifically, flow channel 104 is narrower closer to housing contact surface 124 and opens up into cavity 128. Because of this profile difference, flow channel 104 is either restricted (and, in some cases, blocked) by main seal 192 or not depending on the position of inner guide 130. Specifically, FIG. 1K illustrates applicator 100 with inner guide 130 in its protracted position 101 and flow channel 104 being restricted (and, in some cases, blocked) by main seal 192. In this position, main seal 192 is positioned in the narrow portion of flow channel 104. FIG. 1L illustrates applicator 100 with inner guide 130 in its retracted position 103 and flow channel 104 not restricted (or blocked) by main seal 192. In this position, main seal 192 is moved where flow channel 104 is wider and material 302 can flow through flow channel 104 around main seal 192.

Processing Examples

FIG. 2 is a process flowchart corresponding to method 200 for applying material 302 at interface area 157, in accordance with some embodiments. Method 200 may use applicator 100, various examples of which are described above. In some embodiments, method 200 may be practiced with other types of applicators or equipment. Interface area 157 is defined as an area surrounding the interface between part 152 and fastener 156, for example. The deposit of material 302 formed in interface area 157 during method 200 may be in the form of a fillet or have any other shape providing sealing to the interface. It should be noted that, in some embodiments, method 200 may be used to apply material 302 at any other control area that may not necessarily be defined as an interface area. In general, method 200 may be used for applying material 302 at a control area such that other areas surrounding the control area may not be contaminated with applied material 302.

Method 200 may proceed with sealing interface 157 area during operation 201. Interface area 157 is sealed from a remaining surface of fastener 156 and a remaining surface of part 152, according to some embodiments. These remaining surfaces do not extend into interface area 157.

In some embodiments, operation 201 involves sealingly engaging fastener 156 during operation 202 followed by sealing engaging part 152 during operation 204. Specifically, fastener 156 may be sealingly engaged by inner guide 130 during operation 202. Inner guide contact surface 132 may be pressed against fastener surface 158.

FIG. 3A is a schematic cross-sectional representation of applicator 100 and fastener assembly 150 after operation 202. At this stage, fastener 156 is in contact with inner guide 130 or, more specifically, inner guide contact surface 132 is pressed against fastener surface 158. In some embodiments, when inner guide contact surface 132 is pressed against fastener surface 158, applicator 100 is self-aligned with respect to fastener 156. This self-alignment may be achieved by using a particular shape for inner guide contact surface 132 that, for example, mates with fastener surface 158 forcing inner guide 130 and, more generally, applicator 100 into a particular orientation.

FIG. 3A illustrates inner guide 130 in its protracted position 101 with a portion 113 of inner guide 130 extending outside of housing 120. Inner guide 130 moves into its retracted position 103 in a later operation further described below. Interface area 157 is not completely sealed at this stage. Furthermore, material 302 is not delivered into interface area 157 at this stage. Inner guide contact surface 132 may have a profile of fastener surface 158 for sealing. For example, inner guide contact surface 132 may have a coned shape to match fastener surface 158, which may be (at least in part a chamfer on the head of fastener 156). One having ordinary skills in the art that inner guide contact surface 132 may a shape to accommodate any other shape of fastener, such as splined nuts/heads, hex nuts/heads, and the like.

Returning to FIG. 2, after operation 202, part 152 may be sealingly engaged during operation 204. Specifically, inner guide 130 of applicator 100 may be slid with respect to and inside housing 120 until housing 120 contacts part 152 or, more specifically, until housing contact surface 124 sealingly engages part surface 154. After this operation, interface area 157 may be sealed and ready to receive material 302. Because interface area 157 is sealed, material 302 does not go outside of interface area 157.

FIG. 3B is a schematic cross-sectional representation of applicator 100 and fastener assembly 150 after operation 204. Inner guide 130 is now in its retracted position 103. As shown in this example, inner guide 130 may be disposed within cavity 128 of housing 120 such that inner guide 130 does not extend outside of cavity 128. FIG. 3C is a schematic expanded view of portion (also identified in FIG. 3B with a dashed boundary) around interface area 157. At this stage of the process, interface area 157 has void. In some embodiments, interface area 157 may not include any material 302 at this state. Alternatively, some material 302 may be carried into interface area 157 during operation 204, for example by advancing housing 120 toward part 152.

Returning to FIG. 2, after interface area 157 is sealed, method 200 may proceed with form deposit 314 of material 302 in interface area 157 area during operation 205. Deposit 314 is formed simultaneously around the entire perimeter of interface area 157. Specifically, material 302 may flow through the flow channel of the applicator onto the interface area.

During operation 205, material 302 is substantially contained within interface area 157. In other words, material 302 does not go onto other portions of fastener 156 and part 152 that are not within interface area 157. Deposit 314 may have a continuous ring shape as, for example, shown in FIG. 4 and further described below. During operation 205, deposit 214 is formed simultaneously around the entire perimeter of interface area 157. Furthermore, material 302 is delivered to interface area 157 by flowing material 302 through a flow channel an applicator as describe above with reference to FIGS. 1A-1M. The flow channel has a ring shape and is defined by the internal wall of the housing of the applicator as well as by the external wall of the inner guide of the applicator.

In some embodiments, while delivering material 302 during operation 206 and/or following operation 206, method 200 may involve rotating at least a portion of applicator 100 with respect to fastener 156 and part 152. For example, housing 120 of applicator 100 may be rotated with respect to fastener 156 and part 152, while inner guide 130 may remain stationary. Alternatively, housing 120 may remain stationary, while inner guide 130 may be rotated with respect to fastener 156 and part 152. Furthermore, inner guide 130 and housing 120 may be both rotated (e.g., with the same rotational speed) with respect to fastener 156 and part 152. The rotation may be used to eliminate any voids or inconsistencies in material 302 provided into interface area 157 by redistributing material 302 within interface area 157. For example, eliminate any voids or inconsistencies in material 302 may be due to the surface tension, viscosity of material 302 and other factors. It should be noted that the rotation is optional and, in some embodiments, the rotation is not performed. Furthermore, it should be noted that when the rotation is performed, it is performed while interface area 157 remains sealed. As such, this rotation is different from a swirling motion used in a conventional process described above. Furthermore, the rotation can be to fare the fillet or, more generally, deposit 314 formed by material 302.

FIG. 3D is a schematic cross-sectional representation of applicator 100 and fastener assembly 150 after operation 206, in accordance with some embodiments, while FIG. 3E is a schematic expanded view of portion (identified in FIG. 3D with a dashed boundary). At this stage, interface area 157 is filled with material 302. Material 302 is contained within interface area 157 since housing 120 remains sealingly engaged to part 152 and inner guide remains sealingly engaged to fastener 156.

Returning to FIG. 2, after material 302 is delivered to interface area 157, method 200 may continue with exposing interface area 157 during operation 207. After this operation, interface area 157 remains filled with material 302 while the surfaces of fastener 156 and part 152 outside interface area 157 may be substantially free from material 302. In some embodiments, operation 207 may involve disengaging part 152 from housing 120 during operation 208 and then disengaging fastener 156 from inner guide 130 during operation 210. During operation 208, inner guide 130 may slide with respect to housing 120 from retracted position 103 to protracted position 101 of inner guide 130.

FIG. 3F is a schematic cross-sectional representation of applicator 100 and fastener assembly 150 after operation 208, while FIG. 3G is a schematic expanded view of portion (identified in FIG. 3F with a dashed line boundary). It should be noted that while part 152 is being disengaged from housing 120 during operation 208, fastener 156 remains engaged to inner guide 130 during this operation.

Returning to FIG. 2, operation 210 may be performed after completing operation 208. During operation 210, fastener 156 is disengaged from inner guide 130 or, more specifically, from inner guide contact surface 132. After operation 210, interface area 157 is fully exposed and filled with material 302. In other words, housing 120 and inner guide 130 do not contact part 152, fastener 156, or material 302 disposed within interface area 157. Material 302 may be contained within interface area 157 due to its viscosity. In some embodiments, material 302 is at least partially cured at the end of operation 210, which also completes operation 207.

FIG. 3H is a schematic cross-sectional representation of fastener assembly 150 after operation 207 is completed. The applicator is away from fastener assembly 150 and, therefore, is not shown in FIG. 3H. FIG. 3I is a schematic expanded view a portion identified with a dashed line boundary in FIG. 3H. Deposit 314 is positioned in interface area 157 and may have the shape of a fillet or any other suitable shape. In some embodiments, the shape of deposit 314 is substantially the same as the shape of interface area 157, which was sealed during earlier operation. While interface area 157 is filled with material 302 thereby forming deposit 314, the remaining surfaces of fastener 156 and part 152 (outside of the interface area) may be free from material 302.

Experimental Results

FIG. 4 is a photograph of fastener assembly 150 having deposit 314 of material 302 in interface area 157 formed by fastener 156 and part 152, in accordance with techniques described herein. The photograph illustrates that the top surface of fastener 156 is substantially free from material 302. Furthermore, the photograph illustrates that deposit 314 does not have any gaps or voids at least on the visible surface of material 302. Furthermore, deposit 314 has a continuous ring shape.

When the same material is applied using a conventional technique, the material completely covers the fastener. The tip of the material deposit in such a way may have an uneven surface, which in some embodiments may result in voids. Furthermore, not being restricted to any particular theory, it has been estimated that the amount of material deposited using the conventional technique is at least double the amount of material deposited using techniques described herein. In fact, it is believed that the sealing characteristics of the material deposited using methods and systems described herein are improved because the material is distributed in a more controlled location (e.g., into an interface area, where it is used for sealing). Furthermore, in some embodiments, the deposited material is redistributed after it being dispensed into the interface area to eliminate voids.

Examples of Aircraft Application

Examples of this disclosure may be described in the context of an aircraft manufacturing and service method 1100 as shown in FIG. 5 and aircraft 1102 as shown in FIG. 6. During pre-production, illustrative method 1100 may include specification and design (operation 1104) of aircraft 1102 and material procurement (operation 1106). During production, component and subassembly manufacturing (operation 1108) and system integration (operation 1110) of aircraft 1102 take place. Thereafter, aircraft 1102 may go through certification and delivery 1112 to be placed in service (operation 1114). While in service by a customer, aircraft 1102 is scheduled for routine maintenance and service (operation 1116), which may also include modification, reconfiguration, refurbishment, and so on. Various materials may be applied using techniques described herein during one or more of operations 1108, 1110, 1114, and 1116.

The processes of illustrative method 1100 may be performed or carried out by a system integrator, a third party, and/or an operator (e.g., a customer). For the purposes of this description, a system integrator may include any number of aircraft manufacturers and major-system subcontractors. Likewise, a third party may include any number of vendors, subcontractors, and suppliers. In some embodiments, an operator may be an airline, leasing company, military entity, service organization, and so on.

As shown in FIG. 6, aircraft 1102 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. This example related to aerospace applications. The principles disclosed herein may be applied to other industries, such as the automotive industry. Accordingly, in addition to aircraft 1102, the principles disclosed herein may apply to other vehicles, e.g., land vehicles, marine vehicles, space vehicles, etc. The sealing techniques described herein may be used for sealing penetrations through the skin of the wing or fuselage or fasteners through an exterior surface or for sealing fasteners in the environment potentially exposed to moisture on the interior.

Apparatus and methods shown or described herein may be employed during any one or more of the stages of the aircraft manufacturing and service method 1100. For example, components or subassemblies corresponding to component and subassembly manufacturing 1108 may be fabricated or manufactured in a manner similar to components or subassemblies produced while aircraft 1102 is in service. Also, one or more aspects of the apparatus, method, or combination thereof may be utilized during operations 1108 and 1110, for example, by substantially expediting assembly of or reducing the cost of aircraft 1102. Similarly, one or more aspects of the apparatus or method realizations, or a combination thereof, may be utilized, for example, while aircraft 1102 is in service, e.g., maintenance and service 1116.

CONCLUSION

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

What is claimed is:

1. A method for depositing a material in an interface area defined by a fastener and a part, the method comprising:
sealing the interface area from a remaining surface of the fastener and a remaining surface of the part, wherein the remaining surface of the fastener is outside of the interface area, and wherein the remaining surface of the part is outside of the interface area, wherein sealing the interface area comprises:
sealingly engaging the fastener with an inner guide contact surface of an inner guide of an applicator while the inner guide is in a protracted position, wherein the inner guide contact surface is located at an end of the inner guide, and
after sealingly engaging the fastener with the inner guide, sealingly engaging the part with a housing contact surface of a housing of the applicator by moving the inner guide with respect to the housing from the protracted position to a retracted position; and
flowing the material through a flow channel formed between the housing and the inner guide, wherein the flow channel extends to the inner guide contact surface and the housing contact the surface, wherein the flow channel is restricted when the inner guide is in the protracted position and unrestricted when the inner guide is in the retracted position; and
forming a deposit of the material having a continuous ring shape formed simultaneously around an entire perimeter of the interface area.

2. The method of claim 1, wherein sealingly engaging the fastener with the inner guide contact surface aligns the applicator with respect to the fastener and the part.

3. The method of claim 1, further comprising, after forming the deposit, exposing the interface area having the deposit, wherein, after exposing the interface area, the remaining surface of the fastener and the remaining surface of the part are substantially free from the material, wherein the remaining surface of the fastener and the remaining surface of the part are positioned outside of the interface area.

4. The method of claim 3; wherein exposing the interface area comprises disengaging the part from the housing followed by disengaging the fastener from the inner guide.

5. A method for forming a deposit of material, the method comprising:
operating an applicator in a retracted position,
wherein the applicator includes a housing defining a cavity, and an inner guide slidably disposed within the cavity of the housing such that the housing and the inner guide form a flow channel within the cavity between the inner guide and the housing,
wherein the housing is configured to slide with respect to the inner guide between the retracted position and a protracted position,
wherein the flow channel is restricted when the housing is in the retracted position; and
in the retracted position, sealingly engaging a first surface with an inner guide contact surface of the inner guide to partially define an interface area; wherein the inner guide contact surface is located at an end of the inner guide and the flow channel is continuous with the cavity and extends from the cavity to the inner guide contact surface; and
in the protracted position,
flowing the material through the cavity and the flow channel, and
forming the deposit of material at the interface area.

6. The method of claim 5, further comprising:
positioning the housing into the protracted position to sealingly engage a second surface with a housing contact surface of the housing to define the interface area of the first surface and the second surface between the inner guide and the housing.

7. The method of claim 6,
wherein the deposit of material is formed at the interface area in a continuous ring shape.

8. The method of claim 6, further comprising:
after forming the deposit of material,
returning the housing to the retracted position to restrict the flow channel and stop deposition of material onto the interface area, and
exposing the interface area having the deposit of material, wherein, after exposing the interface area, a remaining portion of the first surface and a remaining portion of the second surface are substantially free from the deposit of material.

9. The method of claim 8, wherein exposing the interface area comprises disengaging the second surface from the housing contact surface followed by disengaging the first surface from the inner guide contact surface.

10. The method of claim 5, wherein the flow channel is formed between an internal wall of the housing and an external wall of the inner guide, the flow channel having a ring shape.

11. The method of claim 10, wherein the applicator further comprises two or more guiding protrusions located within the flow channel,
wherein the two or more guiding protrusions extend from the inner guide and into corresponding guiding recesses of the housing such that the two or more guiding protrusions partially separate the ring shape of the flow channel,
wherein the two or more guiding protrusions do not extend to the inner guide contact surface such that the ring shape of a portion of the flow channel at the inner guide contact surface is continuous and is unobstructed by any guiding protrusions or spokes, and
wherein each guiding recess includes a length that allows the corresponding guiding protrusion to slide within the respective guiding recess as the housing slides between the retracted position and the protracted position to define a sliding direction of the housing with respect to the inner guide.

12. The method of claim 5,
wherein in the protracted position, the end of the inner guide is positioned within the cavity of the housing; and
wherein in the retracted position, the end of the inner guide extends outside of the housing.

13. The method of claim 5, wherein the applicator further comprises a center support located within the cavity and coupled to the housing via one or more spokes that extend through and partially separate the cavity, wherein the inner guide is coupled to the center support.

14. The method of claim 5, wherein the applicator further comprises a biasing mechanism disposed between the housing and the inner guide and urging the housing into the retracted position.

15. The method of claim 5, wherein the applicator further comprises a retaining mechanism keeping the inner guide from protracting out of the housing beyond the protracted position.

16. The method of claim 15, wherein the retaining mechanism blocks the flow channel when the inner guide is in the protracted position.

17. A method for forming a deposit of material, the method comprising:
operating an applicator in a retracted position, wherein the applicator includes:
a housing defining a cavity, and an inner guide slidably disposed within the cavity of the housing such that the housing and the inner guide form a flow channel within the cavity between an internal wall of the housing and an external wall of the inner guide, wherein the housing is configured to slide with respect to the inner guide between the retracted position and a protracted position,
a bypass channel within the inner guide, and
a first seal and a second seal located within the flow channel, each of the first seal and second seal positioned around the inner guide and moveable with the inner guide, and
in the retracted position, sealingly engaging a first surface with an inner guide contact surface of the inner guide to partially define an interface area,
wherein the inner guide contact surface is located at an end of the inner guide and the flow channel is continuous with the cavity and extends from the cavity to the inner guide contact surface, and
wherein in the retracted position, the end of the inner guide extends outside of the cavity, and the first seal is configured to contact the internal wall of the housing to restrict an interior portion of the flow channel from an exterior portion of the flow channel; and
in the protracted position,
flowing the material through the cavity to the interior portion of the flow channel,
flowing the material from the interior portion of the flow channel through the bypass channel and to the exterior portion of the flow channel, and
forming the deposit of material at the interface area.

18. The method of claim 17, further comprising:
positioning the housing in the protracted position to sealingly engage a second surface with a housing contact surface of the housing to define the interface area of the first surface and the second surface between the inner guide and the housing;
wherein in the protracted position,
the end of the inner guide is positioned within the cavity of the housing,
the second seal is configured to contact the internal wall of the housing to restrict the interior portion of the flow channel from the exterior portion of the flow channel, and
the bypass channel interconnects the interior portion of the flow channel with the exterior portion or the flow channel.

19. The method of claim 18,
wherein the deposit of material is formed at the interface area in a continuous ring shape.

20. The method of claim 19, further comprising:
after forming the deposit of material,
returning the housing to the retracted position to restrict the flow channel and stop deposition of material onto the interface area, and
exposing the interface area having the deposit of material, wherein, after exposing the interface area, a remaining portion of the first surface and a remaining portion of the second surface are substantially free from the deposit of material.

21. The method of claim 17, wherein the applicator further comprises a center support located within the cavity and coupled to the housing via one or more spokes that extend through and partially separate the cavity, wherein the inner guide is coupled to the center support.

22. An applicator for forming a deposit of material, the applicator comprising:
a housing defining a cavity;
an inner guide slidably disposed within the cavity of the housing such that the housing and the inner guide form a flow channel within the cavity between an internal wall of the housing and an external wall of the inner guide, wherein the housing is configured to slide with respect to the inner guide between a retracted position and a protracted position;
a bypass channel within the inner guide; and
a first seal and a second seal located within the flow channel, each of the first seal and the second seal positioned around the inner guide and moveable with the inner guide;
wherein in the retracted position,
an inner guide contact surface of the inner guide is configured to sealingly engage a first surface to partially define an interface area, wherein the inner guide contact surface is located at an end of the inner guide and the flow channel is continuous with the cavity and extends from the cavity to the inner guide contact surface, and
the end of the inner guide extends outside of the cavity, and the first seal is configured to contact the internal wall of the housing to restrict an interior portion of the flow channel from an exterior portion of the flow channel; and
wherein in the protracted position, the material is flowed through the cavity to the interior portion of the flow channel, and through the bypass channel to the exterior portion of the flow channel to form the deposit of material at the interface area.

23. The applicator of claim 22, further comprising a center support located within the cavity and coupled to the housing via one or more spokes that extend through and partially separate the cavity, wherein the inner guide is coupled to the center support.

24. The applicator of claim 22, wherein in the protracted position,
a housing contact surface of the housing is configured to sealingly engage a second surface to define the interface area of the first surface and the second surface between the inner guide and the housing,
the end of the inner guide is positioned within the cavity of the housing,
the second seal is configured to contact the internal wall of the housing to restrict the interior portion of the flow channel from the exterior portion of the flow channel, and
the bypass channel interconnects the interior portion of the flow channel with the exterior portion of the flow channel.

* * * * *